US005422821A

United States Patent [19]

Allen et al.

[11] Patent Number: 5,422,821

[45] Date of Patent: Jun. 6, 1995

[54] APPARATUS FOR INTERCEPTING AND FORWARDING INCORRECTLY ADDRESSED POSTAL MAIL

[75] Inventors: Ronald L. Allen, Grand Prairie; Brenda J. Bishop-Jones; Michael J. Cykana, both of Arlington; Eddie K. Lui, Euless; Stanley W. Sipe, Arlington, all of Tex.

[73] Assignee: ElectroCom Automation, L.P., Arlington, Tex.

[21] Appl. No.: 864,437

[22] Filed: Apr. 6, 1992

[51] Int. Cl.[6] .............................................. G06F 17/60

[52] U.S. Cl. .................................... 364/478; 209/584; 209/900

[58] Field of Search .................... 364/478, 401, 464.03, 364/464.02; 235/375; 209/900, 584; 270/58; 198/349.6; 177/4; 382/10, 11, 12, 13

[56] References Cited

U.S. PATENT DOCUMENTS

| | | | |
|---|---|---|---|
| 4,578,759 | 3/1986 | Horii | 364/478 |
| 4,641,753 | 2/1987 | Tamada | 209/546 |
| 4,873,645 | 10/1989 | Hunter et al. | 364/464.02 |
| 4,979,605 | 12/1990 | Svyatsky | 364/478 |
| 4,992,649 | 2/1991 | Mampe et al. | |
| 5,005,124 | 4/1991 | Connell et al. | 364/401 |
| 5,031,223 | 7/1991 | Rosenbaum et al. | 364/478 |
| 5,043,908 | 8/1991 | Manduley et al. | 364/478 |
| 5,050,078 | 9/1991 | Sansone | 364/406 |
| 5,058,030 | 10/1991 | Schumacher | 364/478 |
| 5,142,482 | 8/1992 | Sansone | 364/478 |
| 5,146,403 | 9/1992 | Goodman | 364/401 |

*Primary Examiner*—James P. Trammell
*Attorney, Agent, or Firm*—Harold E. Meier

[57] ABSTRACT

The present invention comprises apparatus for identifying, intercepting and forwarding incorrectly addressed mailpieces having either a machine readable or non-machine readable address. The apparatus reads (either mechanically or manually) the addressee name and the mailpiece destination marking address for processing in a database and comparison to a list of names and former addresses in the USPS National Change of Address database of persons who have requested mail forwarding service. If the read name and address match a name and former address in the database, then the mailpiece is identified as having an incorrect address and intercepted from the mail stream. The apparatus then searches the NCOA database for a forwarding address and delivery point ZIP code corresponding to the address. The forwarding address and delivery point ZIP marking number are printed on the mailpiece in place of the incorrect address and the mailpiece is returned to the mail stream for delivery to the addressee.

41 Claims, 10 Drawing Sheets

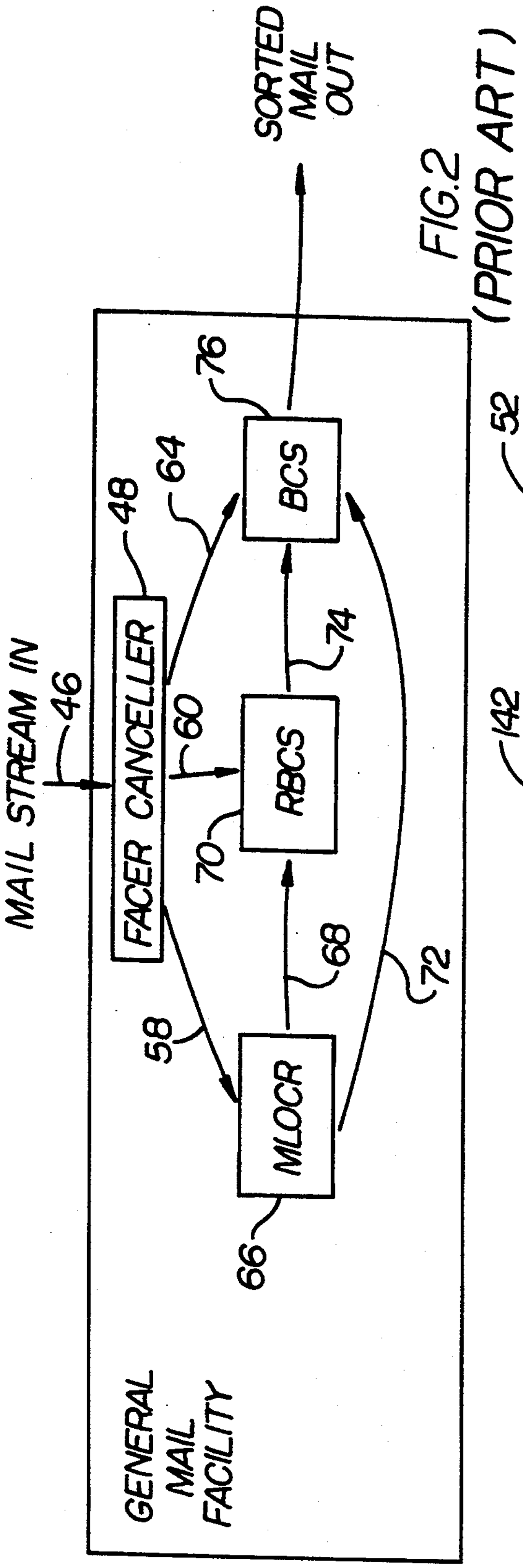
FIG.2 (PRIOR ART)
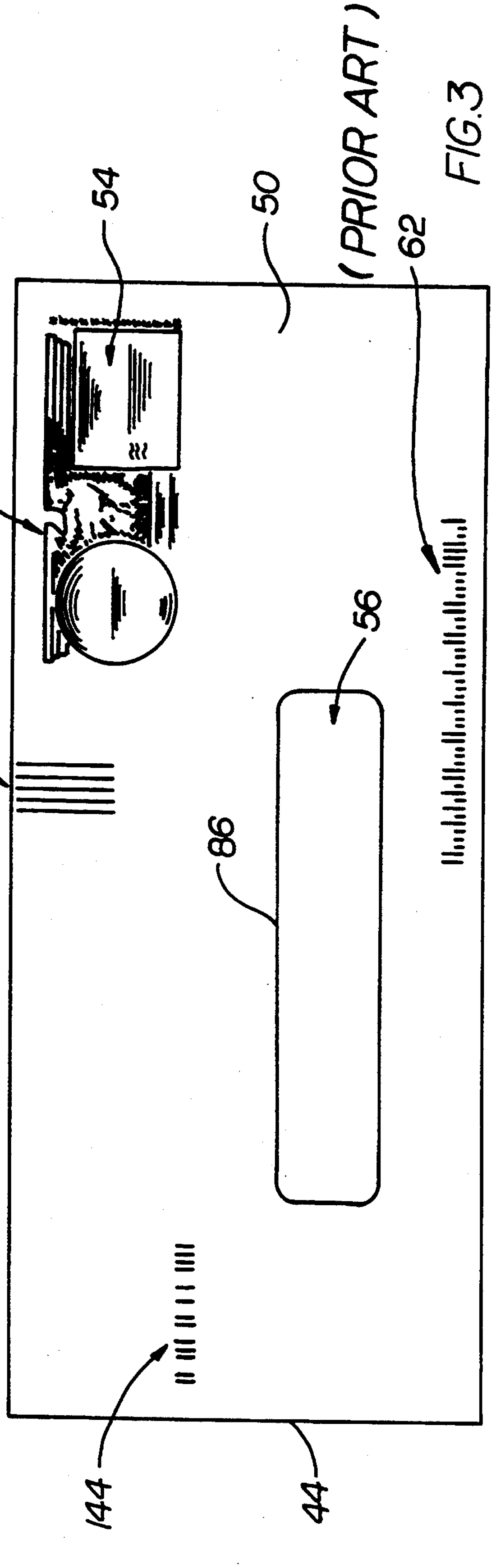
(PRIOR ART) FIG.3

APPARATUS FOR INTERCEPTING AND FORWARDING INCORRECTLY ADDRESSED POSTAL MAIL

TECHNICAL FIELD

The present invention relates to the automated and semi-automated processing of postal mailpieces and, in particular, to the identification, interception and forwarding of incorrectly addressed mailpieces from the mail stream by first identifying a mailpiece as a candidate for forwarding by comparing the name of the addressee and the destination address read from a mailpiece to a list of names and former addresses of persons who have requested mail forwarding and then forwarding the mailpiece to a forwarding address designated by the addressee.

BACKGROUND OF THE INVENTION

According to current United States Postal Service (USPS) procedures, the local post office (destination delivery unit) is responsible for identifying those mailpieces that are incorrectly addressed and require forwarding. The mail carrier typically recognizes the address on the mailpiece as no longer valid (incorrect) during the "casing" operation at the post office or during an attempted delivery of the mailpiece to the designated destination address. Most often the identification of incorrectly addressed mailpieces will only occur if the addressee completes and submits a Change of Address Order Form that requests mailpiece forwarding. A mailpiece identified as in need of forwarding is manually segregated by the carrier from correctly addressed mailpieces and removed from the mail stream to a USPS Computerized Forwarding System (CFS) for address correction.

The CFS currently utilized by the USPS is a semi-automated, computerized machine that transports the incorrectly addressed mailpieces past a human operator at a very slow rate. The operator reads each mailpiece and enters into a processing computer an extract of the name of the addressee and invalid destination address on the mailpiece. The computer searches a National Change of Address (NCOA) database maintained by the USPS according to the input invalid destination address and displays for the operator a menu of one or more possible choices of names for persons at that address who have filed a mail forwarding request. If there is a match between the name and address on the mailpiece and a name and address in the menu, the operator will select the match to signal the computer and the mailpiece will be tagged for forwarding and manually or mechanically labeled with a forwarding address. A POSTNET (bar/half-bar) destination bar code for the forwarding address is also printed and the mailpiece is returned to the mail stream for normal processing and delivery to the addressee.

A simple example of the flow of an incorrectly addressed mailpiece from an addressor in Dallas to an incorrect address in Boston and then to the correct forwarding address in Los Angeles will illustrate the inherent economic and time concern drawbacks associated with the current USPS mail forwarding system. In Dallas, the mailpiece is deposited in the mail stream by the addressor and processed by the USPS automated postal equipment at a General Mail Facility (GMF) where a destination (POSTNET) bar code corresponding to the destination address in Boston is printed on the mailpiece. The mailpiece is then collected with other similarly coded mailpieces and delivered to Boston where the address on the mailpiece will be checked for the first time for validity. If the mailpiece is found to be incorrectly addressed, the mailpiece is removed from the mail stream and sent to the nearest CFS site to be labeled with the forwarding address designated by the addressee in Los Angeles. A destination (POSTNET) bar code for the forwarding address is then printed and the mailpiece is returned to the mail stream to be transported across the country to Los Angeles for delivery to the forwarding address.

The current mail forwarding system makes inefficient use of limited USPS resources by unnecessarily transporting incorrectly addressed mailpieces to the local post office for the incorrect address before identification, address correction and forwarding occur. Accordingly, there is a need for an apparatus that will identify incorrectly addressed mailpieces prior to the time they are delivered to the local post office for the mailpiece destination address. Furthermore, there is a need for an apparatus that will obtain the forwarding address for the addressee from the incorrect address and then properly label the mailpiece for forwarding.

SUMMARY OF THE INVENTION

The present invention provides an apparatus that will identify, intercept and forward incorrectly addressed mailpieces. In accordance with the broader aspects of the invention, the apparatus functions in either an automated or semi-automated fashion to identify incorrectly addressed mailpieces by reading (either mechanically or manually) the name of the addressee and the destination address on the mailpiece. The read name and address are then compared to a list of names and former addresses of persons who have filed forwarding address information with their local post office. If the read name and address match a name and former address on the list, then the mailpiece is identified as having an incorrect address and is intercepted from the mail stream for further processing. A forwarding address for the addressee is then retrieved along with a corresponding destination (POSTNET) bar code and applied to the mailpiece in place of the incorrect address.

The forwarding mail identification (FMI) and automated mail forwarding (AMF) systems of the present invention may be efficiently incorporated into current USPS automated mail processing equipment. For machine readable mailpieces, an image of the address side of a mailpiece is captured, digitized and processed by an optical character recognition system to decode the name of the addressee and the destination address. The destination address is processed in the USPS ZIP+4 database to obtain a delivery point ZIP code. The ZIP code and/or destination address comprise delivery point information for the mailpiece. To identify the need to forward the mailpiece, the delivery point information and addressee name are processed in an addressee-former address extract of the USPS National Change of Address (NCOA) database for comparison to persons at the delivery point who have requested forwarding of mail. If there is a match between names and addresses, the mailpiece is intercepted from the mail stream with the forwarding address for the addressee retrieved from the NCOA database and applied to the mailpiece in place of the incorrect destination address. A destination (POSTNET) bar code corresponding to the delivery point ZIP code for the forwarding address is also printed on the mailpiece to assist in the automated sorting and delivery of the mailpiece to the addressee.

For non-machine readable mailpieces, an image of the address side of a mailpiece is captured, digitized and stored at an address in memory, linked therein to a unique mailpiece identification number. This digitized image is then displayed for a human operator who enters sufficient destination address information to obtain a delivery point ZIP code from the USPS ZIP+4 database. To identify the need to forward the mailpiece, the delivery point information is processed in an addressee-former address extract of the USPS National Change of Address (NCOA) database. If the operator identifies that the addressee name and address on the mailpiece matches an addressee name and former address at the delivery point, the mailpiece is intercepted from the mail stream. The forwarding address for the addressee is then retrieved by the operator from the NCOA database and applied to the mailpiece in place of the incorrect destination address. A destination (POSTNET) bar code corresponding to the delivery point ZIP code for the forwarding address is also printed on the mailpiece to assist in the automated sorting and delivery of the mailpiece to the addressee.

With integration of the FMI and AMF systems of the present invention into the existing automated USPS mail processing equipment, complete system replacement to effectuate the FMI and AMF systems of the present invention is unnecessary. Furthermore, placement of the identification and forwarding equipment within the USPS automated mail processing equipment allows for substantial savings of time and money by enabling the identification, interception and forwarding of incorrectly addressed mailpieces to occur at the time of mailpiece deposit rather than at the time of mailpiece delivery. The FMI and AMF equipment of the present may further be utilized in non-postal applications, for example, in a merchandise warehouse, to identify incorrectly labeled items prior to shipment or delivery to the customer. Other potential applications will be obvious to those skilled in the art.

BRIEF DESCRIPTION OF THE DRAWINGS

A more complete understanding of the forwarding mail identification (FMI) and automated mail forwarding (AMF) systems of the present invention may be had by reference to the following Detailed Description in conjunction with the accompanying Drawings wherein:

FIG. 2 illustrates the method of processing incoming mailpieces at a USPS General Mail Facility (GMF);

FIG. 3 is an illustration of a typical mailpiece;

DETAILED DESCRIPTION OF THE DRAWINGS

Figure 1:
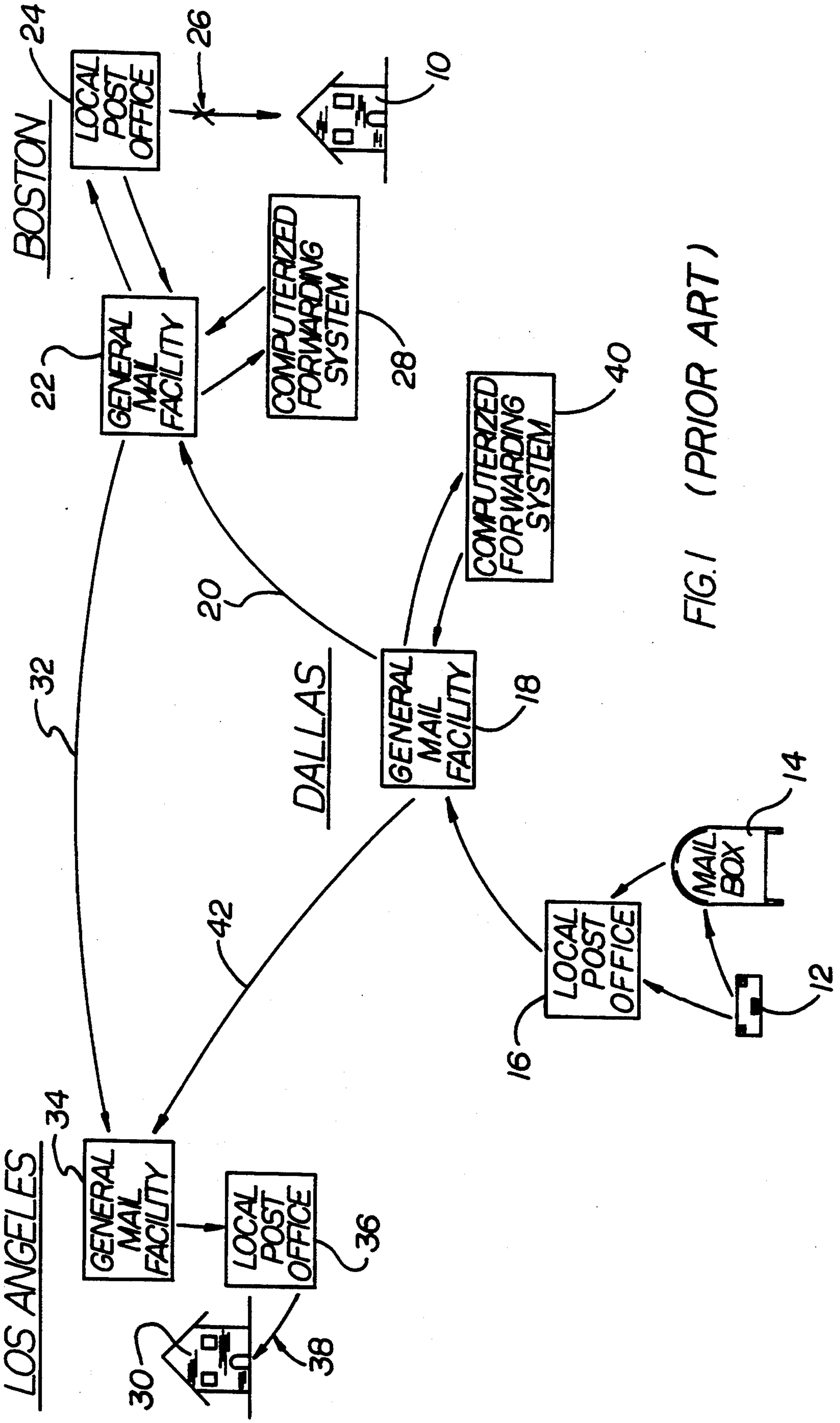
FIG. 1 (PRIOR ART)
FIG. 1 shows the current USPS practice of handling incorrectly addressed mailpieces.

Reference is now made to the Drawings, wherein identical reference numerals refer to like or similar parts and, in particular, to FIG. 1 of the Drawings wherein there is shown the current United States Postal Service (USPS) practice for processing, identifying, intercepting and forwarding of incorrectly addressed mailpieces. The cities referenced herein are used for illustrative purposes only. The process starts, for example, in Dallas when an addressor places an incorrect (no longer valid) destination address, for a location (delivery point) 10 in Boston, on a mailpiece 12. The addressor then deposits the mailpiece 12 in the mail stream at a mailbox 14 or at the local post office 16. Once at the post office 16, the deposited mailpiece 12 is delivered to the General Mail Facility (GMF) 18 for the Dallas area. The Dallas GMF 18 processes the mailpiece 12 through the conventional, well known USPS automated mail processing equipment to determine the delivery point ZIP code for the destination address on the mailpiece 12 at the delivery point 10. A corresponding destination (POSTNET) bar code for that delivery point ZIP code is then printed on the mailpiece. The Dallas GMF 18 equipment sorts the mailpiece 12 according to the affixed destination (POSTNET) code and delivers the mailpiece, as generally indicated at 20, to the GMF 22 for the Boston area.

Once in Boston, the mailpiece 12 is processed according to its destination (POSTNET) bar code through the sorting equipment at the Boston GMF 22 and delivered to the local post office (delivery point unit) 24 for the incorrect address at the delivery point 10. At the local post office 24, the mail carrier cases the mailpiece 12 according to the destination address for the delivery point 10 to facilitate delivery along each designated postal route 26. Eventually, the mail carrier will recognize that the address for the delivery point 10 on the mailpiece 12 is no longer valid (typically by means of a filed change of address form). The incorrectly addressed mailpiece 12 is then manually intercepted by the carrier from the postal stream and sent to a Computerized Forwarding System (CFS) 28 for the Boston area.

At the Boston area CFS 28, the incorrectly addressed mailpiece 12 is handled by a semi-automated process wherein an extract of the name of the addressee and incorrect address for the delivery point 10 is entered by an operator into a computer and processed in the USPS National Change of Address (NCOA) database (generated from all filed change of address forms). The computer will retrieve from the NCOA data base one or more possible choices of addressee name and former address that favorably compare with the operator input name and address at the delivery point 10 for the mailpiece. The operator will then select from the menu of choices provided by the computer, according to known USPS specified forwarding rules, the closest or exact match of names and addresses and obtain a forwarding address for the mailpiece 12 at a delivery point 30 in Los Angeles. The mailpiece 12 is then manually or mechanically labeled with the forwarding address in Los Angeles. A destination (POSTNET) bar code corresponding to the delivery point ZIP code for the forwarding address is also printed on the mailpiece to facilitate transportation, as generally indicated at 32, across the country to the GMF 34 for the Los Angeles area, and delivery through the local post office (delivery point unit) 36 and along the designated postal route 38 to the forwarding address at the delivery point 30.

As illustrated by the example of FIG. 1, the current USPS forwarding mail identification system makes inefficient use of limited USPS time and money by delaying the identification, interception and rerouting (forwarding) of an incorrectly addressed mailpiece until after the mailpiece has reached the local post office for the incorrect destination address. It would be preferable if the identification of an incorrectly addressed mailpiece occurred at the local post office or GMF for the area where the mailpiece is first deposited into the mail stream by the addressor. For the scenario of FIG. 1, for example, if the identification of the incorrectly addressed mailpiece 12 occurred at the Dallas GMF 18, rather than at the local post office 24 in Boston, the local Dallas CFS 40 could be utilized to determine the forwarding address at location 30 and the mailpiece could be transported, as generally indicated at 42, directly to Los Angeles. This would eliminate the added time and cost expended in transporting the mailpiece 12 to and from Boston for delivery to an incorrect destination address. Furthermore, if the new forwarding address at location 30 could be determined at the Dallas GMF 18 (rather than at a CFS), the additional expense of CFS processing would be eliminated.

Referring now to FIG. 2, there is shown the processing method for incoming mailpieces at a USPS General Mail Facility (GMF). Each mailpiece 44 (FIG. 3) in the mail stream 46 is initially processed by a Facer Canceler (FC) 48 that orients the mailpieces according to the address side 50, applies a cancellation mark 52 over the stamp 54, and roughly segregates the mailpieces into three major categories: those having a machine readable destination address 56 (path 58); those having a non-machine readable destination address (path 60); and, those having a destination (POSTNET) bar code 62 (path 64). It will, of course, be understood that mailpieces 44 that have previously been properly oriented, cancelled and segregated, such as mail delivered from another GMF where these processes have already occurred, need not be processed by the FC 48.

Machine readable mailpieces are processed by an automated optical scanning system commonly referred to as a Multiline Optical Character Reader (MLOCR) 66. Non-machine readable mailpieces are received either directly from the FC 48 (path 60) or indirectly from the MLOCR 66 (path 68) and processed by a semi-automated optical imaging apparatus commonly referred to as a Remote Bar Coding System (RBCS) 70. The primary functions of both the MLOCR 66 and RBCS 70 are to read and identify the destination address 56 for the delivery point, determine the unique delivery point ZIP code (delivery point information) for the destination address and print the destination (POSTNET) bar code 62 corresponding to that ZIP code on the mailpiece 44. Destination (POSTNET) bar coded mailpieces, from the FC 48 (path 64), MLOCR 66 (path 72) and RBCS 70 (path 74), are then processed and sorted according to the destination (POSTNET) bar code 62 by a bar code sorter (BCS) 76.

As the FC 48, MLOCR 66, RBCS 70 and BCS 76 are common pieces of USPS automated mail processing equipment whose function, operation and design are well known in the art, detailed functional, operational and design description beyond that needed for an understanding of the present invention is deemed unnecessary. The present invention comprises enhancements in the USPS automated mail processing equipment described above that will add the capability of identifying mailpieces that require forwarding due to an incorrect destination address (known as forwarding mail identification—FMI). Furthermore, the enhancements of the present invention will also obtain and apply the correct forwarding address to an incorrectly addressed mailpiece (known as automated mail forwarding—AMF).

Figure 4:
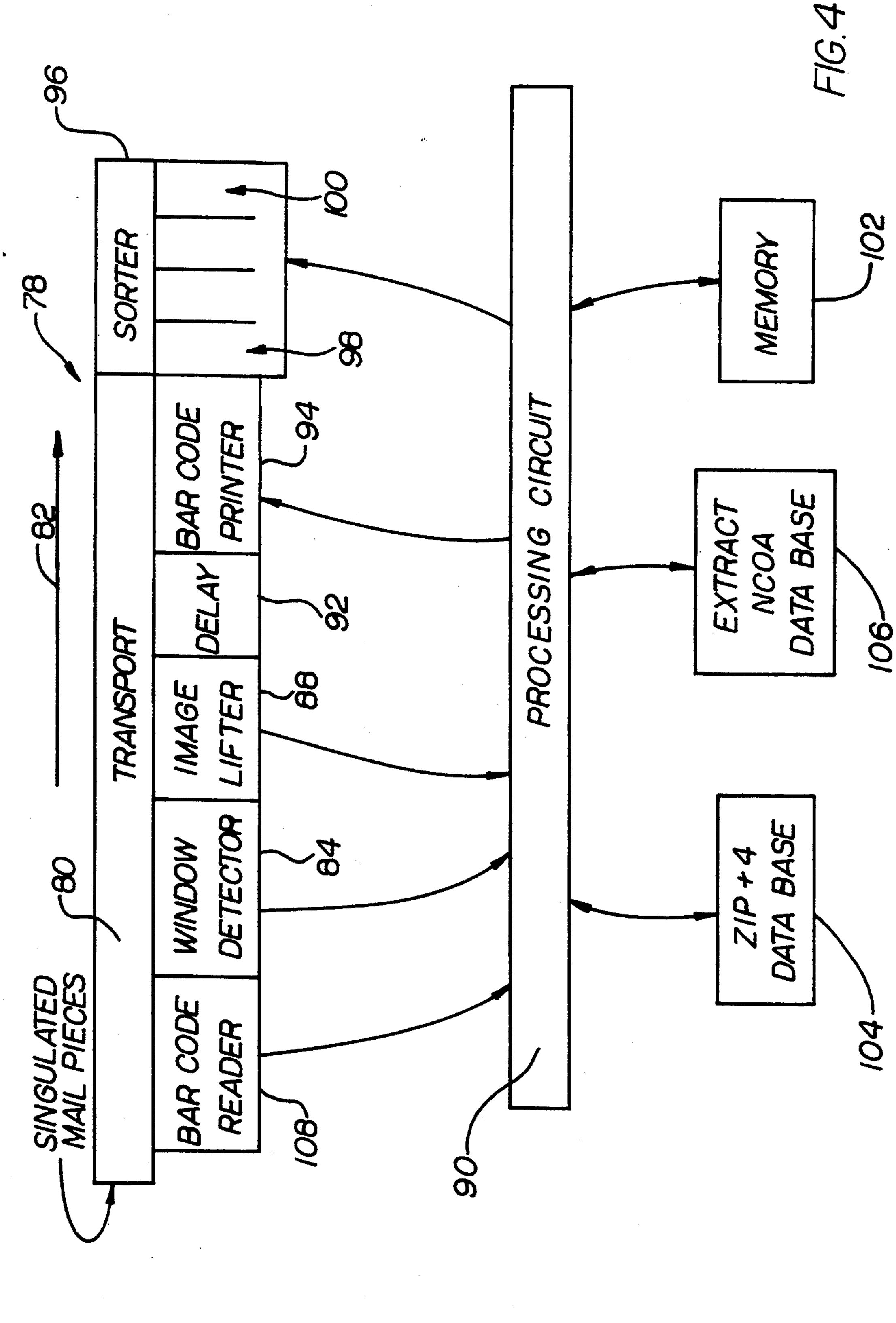
FIG. 4 is a schematic view of the automated forwarding mail identification system (FMI) of the present invention for machine readable mailpieces.

Referring now to FIG. 4, there is shown a schematic illustration of the automated forwarding mail identification system (FMI) 78 of the present invention for machine readable mailpieces. A singulated stream of machine readable mailpieces are fed down a mechanical transport 80 in the direction indicated by arrow 82. A window detector 84 scans each mailpiece to determine the presence of a reflective window 86 (FIG. 3) that identifies the location of the destination address 56 on the mailpiece. Each mailpiece is then scanned by a high resolution video image lifter 88 that digitizes an image of the address side of each mailpiece. While the digitized image is processed by a processing circuit 90 for identification of whether the mailpiece is in need of forwarding, the mailpiece is momentarily held in a mechanical delay 92. If the mailpiece is not identified by the processing circuit 90 as in need of forwarding, a printer 94 applies a destination (POSTNET) bar code on the mailpiece corresponding to the delivery point ZIP code for the destination address, and the mailpiece is directed by a sorter 96 into a designated mail pocket 98 according to the bar code. If the mailpiece is identified by the processing circuit 90 as in need of forwarding, the mailpiece is not coded and is directed by the sorter 96 into a designated forwarding mail pocket 100 and collected for forwarding processing in a manner to be described.

The forwarding mail identification decision is made by the processing circuit 90 while the mailpiece is held in the delay 92. The digitized image of the mailpiece is processed by the circuit 90 in conjunction with window 86 (FIG. 3) information, if any, obtained by the detector 84 to determine the location of the destination address on the mailpiece and the lines of alphanumeric characters therein. Each individual character in the lines of characters (character information) is processed for recognition of the address information to thereby decode and identify the destination address on the mailpiece. The destination address revealed by the decoded character information is processed by the circuit 90 in the USPS ZIP+4 database 104 to determine the delivery point ZIP code for the mailpiece. It will, of course, be understood that any other database including delivery points and corresponding delivery point ZIP codes (for example, the USA database) may be substituted for the ZIP+4 database. The delivery point information (comprised of the delivery point ZIP code and/or destination address) is then processed in an extract of the USPS National Change of Address (NCOA) database 106

(containing the name and former address of each addressee at each delivery point who has filed a change of address form with the USPS) to determine if a forwarding request has been logged against that delivery point. It will, of course, be understood that any other database including a list of addressee names, and former addresses (and forwarding addresses) may be substituted for the NCOA database. The circuit 90 then checks the delivery point information against the list of former addresses for that delivery point. If the addresses match, the character information for the digitized image of the mailpiece is accessed by the circuit 90 to decode the name of the addressee for comparison to the name of the person in the NCOA database 106 requesting forwarding of the mail. If the names match, the circuit 90 identifies the mailpiece as in need of forwarding, saves the character information for the digitized image at an address in the memory 102 for later access and directs the sorter 96 to send the mailpiece into the designated forwarding mail pocket 100 for collection and reprocessing in a manner to be described.

Often, mailpieces arrive at the FMI system 78 pre-bar coded with an identification number. A bar code reader 108 at the entrance to the system 78 scans each mailpiece at entry to detect and transmit the mailpiece identification number to the processing circuit 90 for storage in the memory 102. When the mailpiece is scanned and the image digitized by the image lifter 88, the character information for the digitized image is stored at an address in the memory 102 linked to the mailpiece identification number. If the mailpiece is identified by the system 78 as in need of forwarding (sorted into the designated forwarding mail pocket 100), the linked identification number and character information for the digitized image are retained in memory 102 to be subsequently accessed in a manner to be described to facilitate determination of a forwarding address and mark-up of the mailpiece. If the system 78 does not identify the mailpiece as in need of forwarding, the image and character information are erased from memory and the printer 94 will apply the destination (POSTNET) bar code corresponding to the delivery point ZIP code for the destination address.

Alternatively, if the mailpiece is not pre-coded with an identification number, the processing circuit 90 will generate a mailpiece identification number for storage in the memory 102 when the mailpiece enters the system 78. When the mailpiece is scanned and the image digitized by the image lifter 88, the digitized image is stored at an address in the memory 102 linked to the identification number. If the mailpiece is identified by the system 78 as in need of forwarding, the printer 94 will print an invalid destination (POSTNET) bar code corresponding to the mailpiece identification number on the mailpiece. The linked identification number and character information will be retained in memory 102 to be subsequently accessed in a manner to be described to facilitate determination of a forwarding address and mark-up of the mailpiece. If the system 78 does not identify the mailpiece as in need of forwarding, the character information is erased from memory and the printer 94 will apply the destination (POSTNET) bar code corresponding to the delivery point ZIP code for the destination address.

Figure 5:
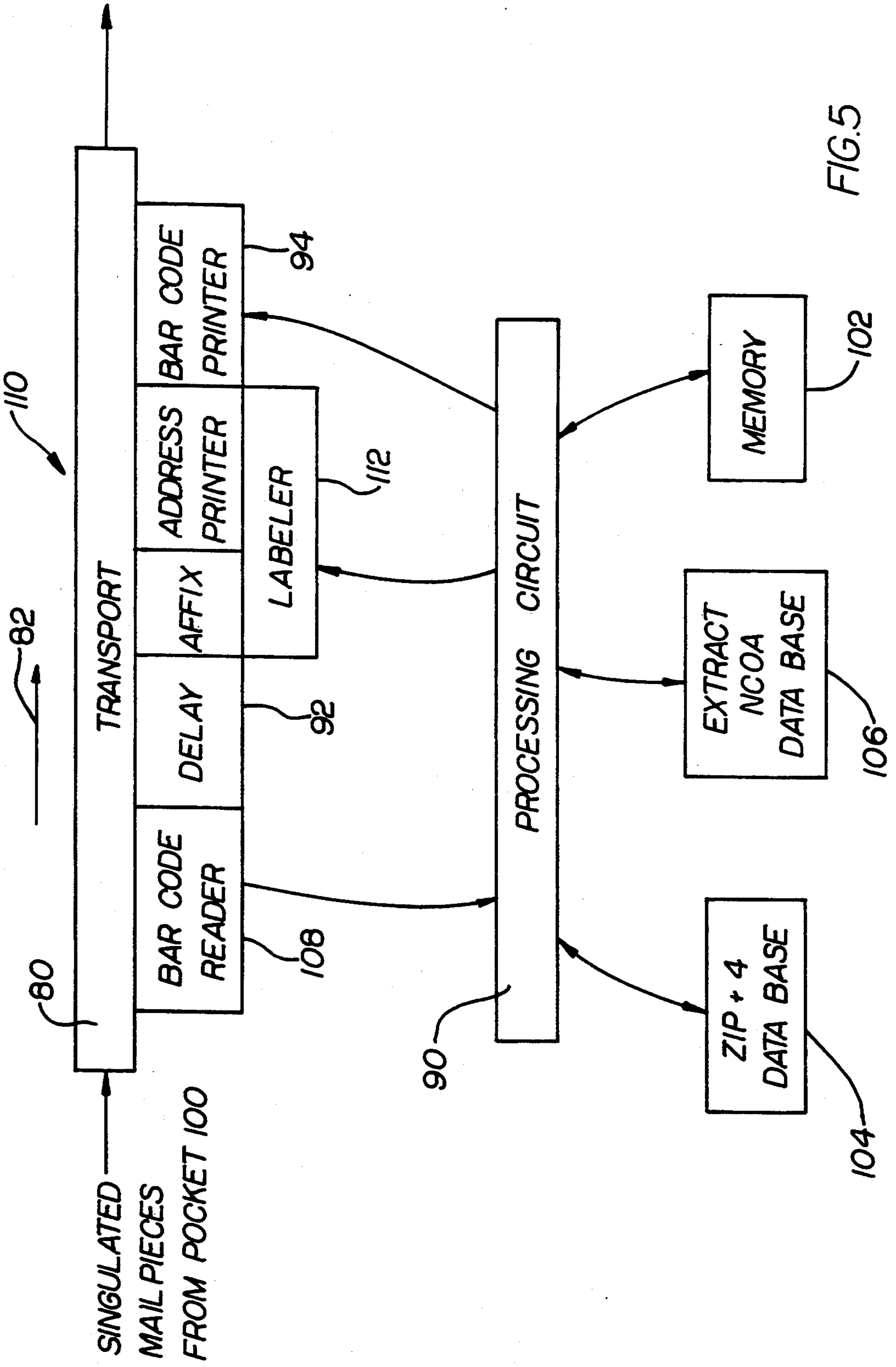
FIG. 5 is a schematic view of a separate stand-alone automated mailpiece mark-up unit.

Reference is now made to FIG. 5 wherein there is shown a stand-alone automated mailpiece mark-up unit 110 for processing incorrectly addressed mailpieces previously marked with a mailpiece identification number and identified as in need of forwarding. The singulated stream of incorrectly addressed mailpieces from pocket 100 are fed down a mechanical transport 80 in the direction indicated by arrow 82. A bar code reader 108 at the entrance to the system 110 detects and transmits the mailpiece identification number to the processing circuit 90 where the stored mailpiece character information, linked to the mailpiece identification number, is accessed from memory 102. While the character information is processed by the circuit 90 to determine a forwarding address, the mailpiece is momentarily held in a mechanical delay 92. If a forwarding address is obtained from the processing circuit 90, a labeler 112 affixes a USPS forwarding label to the mailpiece and prints the forwarding address thereon. A printer 94 also applies a destination (POSTNET) bar code on the mailpiece corresponding to the delivery point ZIP code for the forwarding address.

The processing circuit 90 obtains the forwarding address, while the mailpiece is held in the delay 92, by accessing the stored character information from the memory 102 and decoding the addressee name and destination address for the mailpiece. An extract of the USPS National Change of Address (NCOA) database 106 (containing the address name, former address and forwarding address of each addressee at each delivery point who has filed a change of address form with the USPS) is then searched according to the decoded delivery point information to determine a forwarding address for the mailpiece that will be transmitted to the labeler 112 along with the corresponding forwarding delivery point ZIP code.

Figure 6:
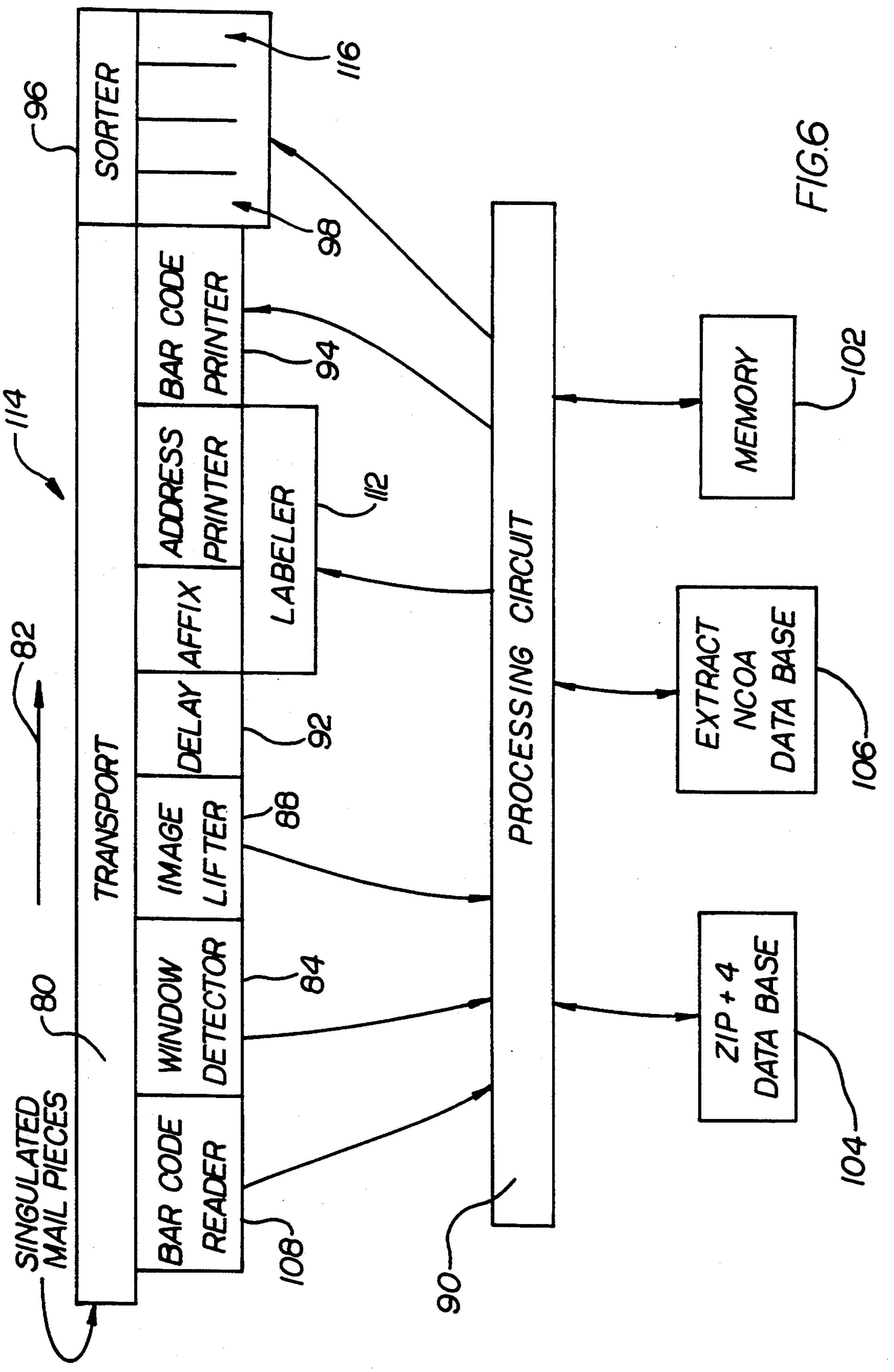
FIG. 6 is a schematic view of the automated mail forwarding system (AMF) of the present invention for machine readable mailpieces.

Referring now to FIG. 6, there is shown a combined FMI-AMF system 114 of the present invention for machine readable mailpieces that identifies mailpieces in need of forwarding and immediately obtains and applies a forwarding address. A singulated stream of machine readable mailpieces are fed down a mechanical transport 80 in the direction indicated by arrow 82. A window detector 84 scans each mailpiece to determine the presence of a reflective window 86 (FIG. 3) that identifies the location of the destination address 56 on the mailpiece. Each mailpiece is then scanned by a high resolution video image lifter 88 that digitizes an image of the address side of each mailpiece. While the digitized image is processed by a processing circuit 90 for identification of whether the mailpiece is in need of forwarding and determination of the forwarding address, the mailpiece is momentarily held in a mechanical delay 92. If the mailpiece is not identified by the processing circuit 90 as in need of forwarding, a printer 94 applies a destination (POSTNET) bar code on the mailpiece corresponding to the delivery point ZIP code for the destination address. If a forwarding address is obtained from the processing circuit 90, a labeler 112 affixes a USPS forwarding label on the mailpiece in place of the incorrect destination address and the forwarding address is printed thereon. A printer 94 also applies a destination (POSTNET) bar code on the mailpiece corresponding to the delivery point ZIP code for the forwarding address. Each mailpiece is then directed by a sorter 96 into a designated mail pocket 98 according to the destination bar code.

The identification and forwarding decisions for each mailpiece are made by the processing circuit 90 while the mailpiece is held in the delay 92. The digitized image of the mailpiece is processed by the circuit 90 in conjunction with window 86 (FIG. 3) information, if any, obtained by the detector 84 to determine the location of the destination address on the mailpiece and the lines of alphanumeric characters therein. Each individual character in the lines of characters (character information) is processed for recognition of address information to thereby decode and identify the destination address on the mailpiece. The destination address revealed by the decoded character information is processed by the circuit 90 in the USPS ZIP+4 database 104 to determine the delivery point ZIP code for the mailpiece. The delivery point information (comprised of the delivery point ZIP code and/or destination address) is then processed in an extract of the USPS National Change of Address (NCOA) database 106 (containing the name, former address and forwarding address of each addressee at each delivery point who has filed a change of address form with the USPS) to determine if a forwarding request has been logged against that delivery point. The circuit 90 then checks the decoded destination address against the list of former addresses for that delivery point. If the addresses match, the character information for the digitized image of the mailpiece is accessed by the circuit 90 to decode the name of the addressee for comparison to the name of the person requesting forwarding of the mail. If the names match, the circuit 90 identifies the mailpiece as in need of forwarding, accesses the forwarding address for the mailpiece from the NCOA database 106 and transmits the forwarding address to the labeler 112 along with the delivery point ZIP code for the forwarding address.

In the event the processing circuit 90 is unable to decode the destination address for the mailpiece (if, for example, the mailpiece is non-machine readable or the processing circuit 90 cannot identify the delivery point ZIP code for the address), then the digitized image obtained by the image lifter 88 is stored at an address in the memory 102 linked to a mailpiece identification number that has been previously printed on the mailpiece. Non-machine readable mailpieces are directed by the sorter 96 into a designated mail pocket 116 and transferred, along with the linked identification numbers and digitized images from memory 102, for subsequent processing.

Figure 7:
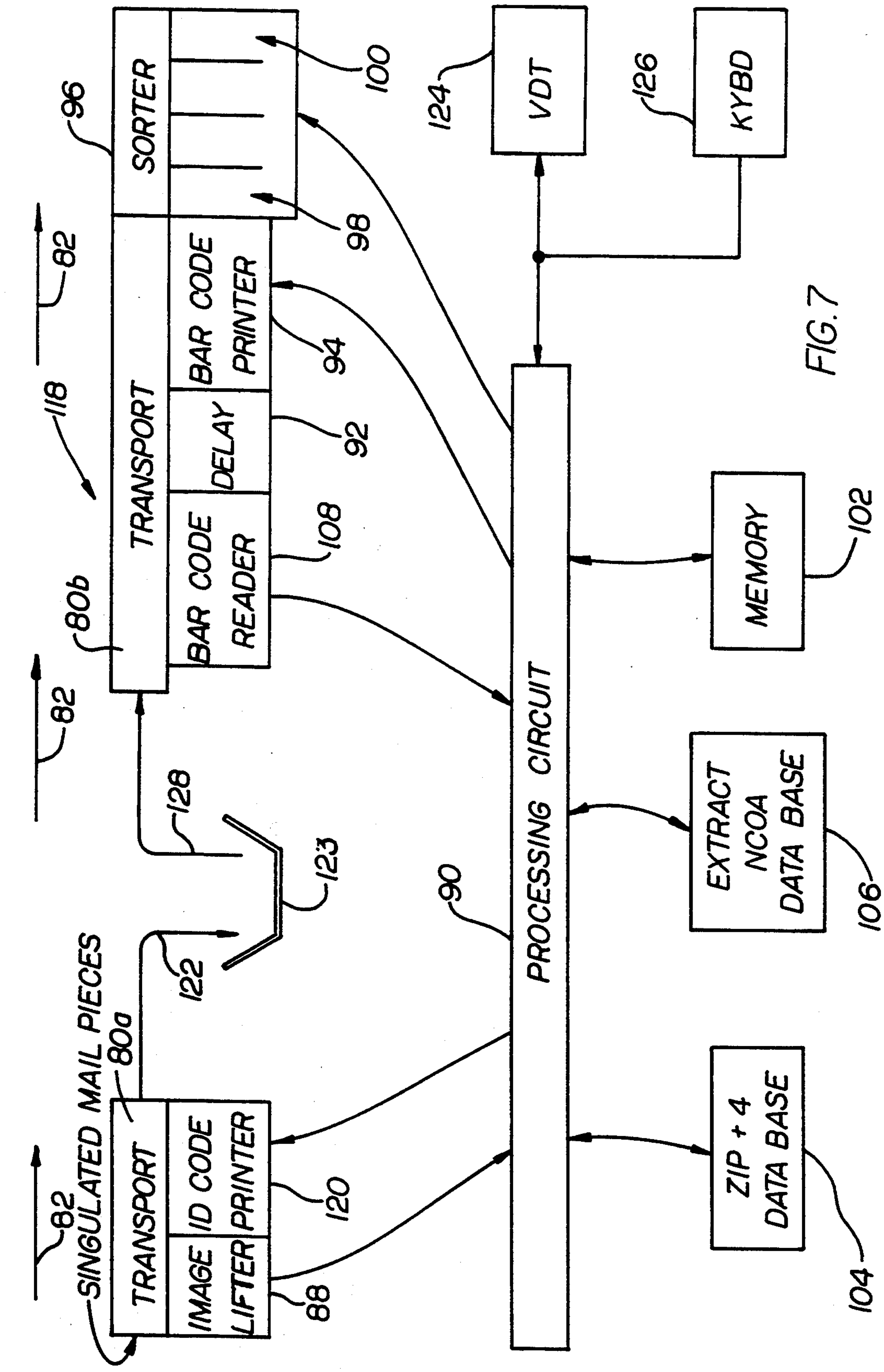
FIG. 7 is a schematic view of the semi-automated forwarding mail identification system (FMI) of the present invention for non-machine readable mailpieces.

Referring now to FIG. 7, there is shown a schematic illustration of the semi-automated forwarding mail identification system (FMI) 118 of the present invention for non-machine readable mailpieces. A singulated stream of non-machine readable mailpieces are fed down a first mechanical transport **80*a* in the direction indicated by arrow 82. Each mailpiece is then scanned by a high resolution video image lifter 88 that digitizes an image of the address side of each mailpiece. As each mailpiece enters the system 118, a processing circuit 90 generates a mailpiece identification number that is applied to the mailpiece by an ID bar code printer 120. The image of the mailpiece that is scanned and digitized by the image lifter 88 is stored in the memory 102 at an address linked to the mailpiece identification number. The transport 80*a* outputs the imaged and ID coded mailpieces, as generally indicated with arrow 122, for temporary storage in a bin 123** while the mailpieces are processed in the manner to be described to identify each mailpiece in need of forwarding.

Because the addresses on these mailpieces cannot be read by a machine, the stored digitized images are processed by one or more human operators who view the digitized images of each mailpiece utilizing a video display terminal (VDT) 124. Each operator accesses a digitized image from the memory 102 using the processing circuit 90. The image is viewed and the operator enters, via a keyboard 126, an extract of the destination address into the processing circuit 90. The destination address is processed by the circuit 90 in the USPS ZIP+4 database 104 to determine the delivery point ZIP code for the mailpiece. The delivery point information (comprised of the delivery point ZIP code and/or destination address) is then processed in an extract of the USPS National Change of Address (NCOA) database 106 (containing the name and former address of each addressee at each delivery point who has filed a change of address form with the USPS) to determine if a forwarding request has been logged against that delivery point. If yes, the operator is prompted by the processing circuit 90 through the VDT 124 with at least one name of a person filing a forwarding request on that delivery point. If the name and address obtained from the NCOA database 106 and the name and address of the imaged mailpiece displayed on the VDT 124 match, the mailpiece is identified as in need of forwarding and an operator enters a forwarding mail notation that is linked with the mailpiece identification number and stored in the memory 102.

After the digitized images of the mailpieces have been manually processed by the operators, the singulated stream of mailpieces is retrieved from the bin 123, as generally indicated with arrow 128, in any desired order and fed down a second mechanical transport 80b in the direction indicated by arrow 82. A bar code scanner 108 at the entrance to the second transport **82*b* detects and transmits to the processing circuit 90 the mailpiece identification number previously applied to each mailpiece. While the identification number is processed by the processing circuit 90 to identify whether the mailpiece is in need of forwarding, the mailpiece is momentarily held in a mechanical delay 92. Using the mailpiece identification number, the processing circuit 90 accesses memory 102 to determine if the operator has entered a forwarding mail notation for the mailpiece. If the mailpiece is not to be forwarded, a printer 94 applies a destination (POSTNET) bar code corresponding to the delivery point ZIP code obtained from the ZIP+4 database 104 for the destination address and the mailpiece is directed by a sorter 96 into a designated mail pocket 98. If the mailpiece is noted for forwarding, the circuit 90 saves the forwarding notation and the forwarding information for the mailpiece in memory 102 at an address linked to the mailpiece identification number for later access and directs the sorter 96 to send the mailpiece into a designated forwarding mail pocket 100** for collection and further processing to obtain the forwarding address and mark-up the mailpiece.

Figure 8:
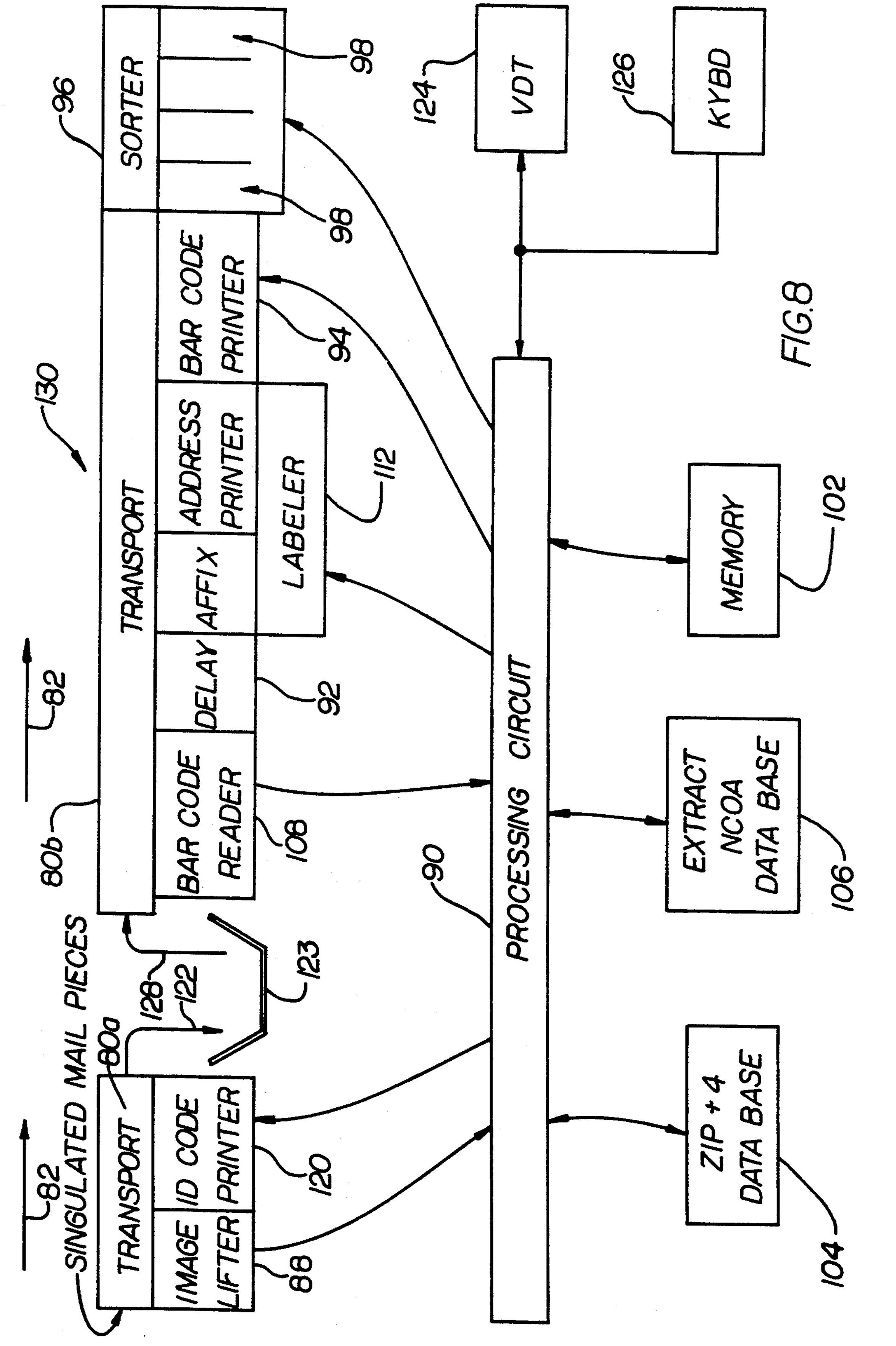
FIG. 8 is a schematic view of the semi-automated mail forwarding system (AMF) of the present invention for non-machine readable mailpieces.

Referring now to FIG. 8, there is shown a combined FMI-AMF system 130 of the present invention for non-machine readable mailpieces that identifies mailpieces in need of forwarding and immediately applies a forwarding address. A singulated stream of non-machine readable mailpieces are fed down a first mechanical transport **80*a* in the direction indicated by arrow 82. Each mailpiece is then scanned by a high resolution video image lifter 88 that digitizes an image of the address side of each mailpiece. As each mailpiece enters the system 130, a processing circuit 90 generates a mailpiece identification number that is applied to the mailpiece by an ID bar code printer 120. The image of the mailpiece that is scanned and digitized by the image lifter 88** is linked to the mailpiece identification number and stored in the memory 102. The transport 80*a* outputs the imaged and ID coded mailpieces, as generally indicated with arrow 122, for temporary storage in a bin 123 while the mailpieces are processed in the manner to be described to identify those mailpieces in need of forwarding and determine the forwarding address.

Because the addresses on these mailpieces cannot be read by a machine, the stored digitized images are processed by one or more human operators who view the digitized images of each mailpiece utilizing a video display terminal (VDT) 124. Each operator accesses a digitized image from the memory 102 using the processing circuit 90. The image is viewed and the operator enters, via a keyboard 126, an extract of the destination address into the processing circuit 90. The destination address is processed by the circuit 90 in the USPS ZIP+4 database 104 to determine the delivery point ZIP code for the mailpiece. The delivery point information (comprised of the delivery point ZIP code and/or destination address) is then processed in an extract of the USPS National Change of Address (NCOA) database 106 (containing the name, former address and forwarding address of each addressee at each delivery point who has filed a change of address form with the USPS) to determine if a forwarding request has been logged against that delivery point. If yes, an operator is prompted by the processing circuit 90 through the VDT 124 with at least one name of a person filing a forwarding request on that delivery point. If the name and address obtained from the NCOA database 106 and the name and address of the imaged mailpiece displayed on the VDT 124 match, the mailpiece is identified as in need of forwarding and the operator enters a forwarding mail notation that is stored in the memory 102 at an address linked with the identification number for the mailpiece. The processing circuit 90 then accesses the NCOA database 106 and retrieves a forwarding address for the mailpiece that is linked to the mailpiece identification number and stored in memory 102.

After the digitized images of the mailpieces have been manually processed by the operators, the singulated stream of mailpieces is retrieved from the bin 123, as generally indicated with arrow 128, in any desired order and fed down a second mechanical transport 80*b* in the direction indicated by arrow 82. A bar code scanner 108 at the entrance to the second transport 82*b* detects and transmits to the processing circuit 90 the mailpiece identification number previously applied to each mailpiece. While the identification number is processed by the processing circuit 90 to identify whether the mailpiece is in need of forwarding, the mailpiece is momentarily held in a mechanical delay 92. Using the mailpiece identification number, the processing circuit 90 accesses memory 102 to determine if the operator has entered a forwarding mail notation. If the mailpiece is not to be forwarded, a printer 94 applies a destination (POSTNET) bar code on the mailpiece corresponding to the delivery point ZIP code obtained from the ZIP database 104 for the destination address. If the mailpiece is noted for forwarding, the circuit 90 retrieves the stored forwarding address linked to the mailpiece identification number in memory 102 and a labeler 112 affixes a USPS forwarding label on the mailpiece in place of the incorrect destination address and the forwarding address is printed thereon. A printer 94 also applies a destination (POSTNET) bar code on the mailpiece corresponding to the delivery point ZIP code, for the forwarding address. Each mailpiece is then directed by a sorter 96 into a designated mail pocket 98 according to the destination bar code.

Figure 9:
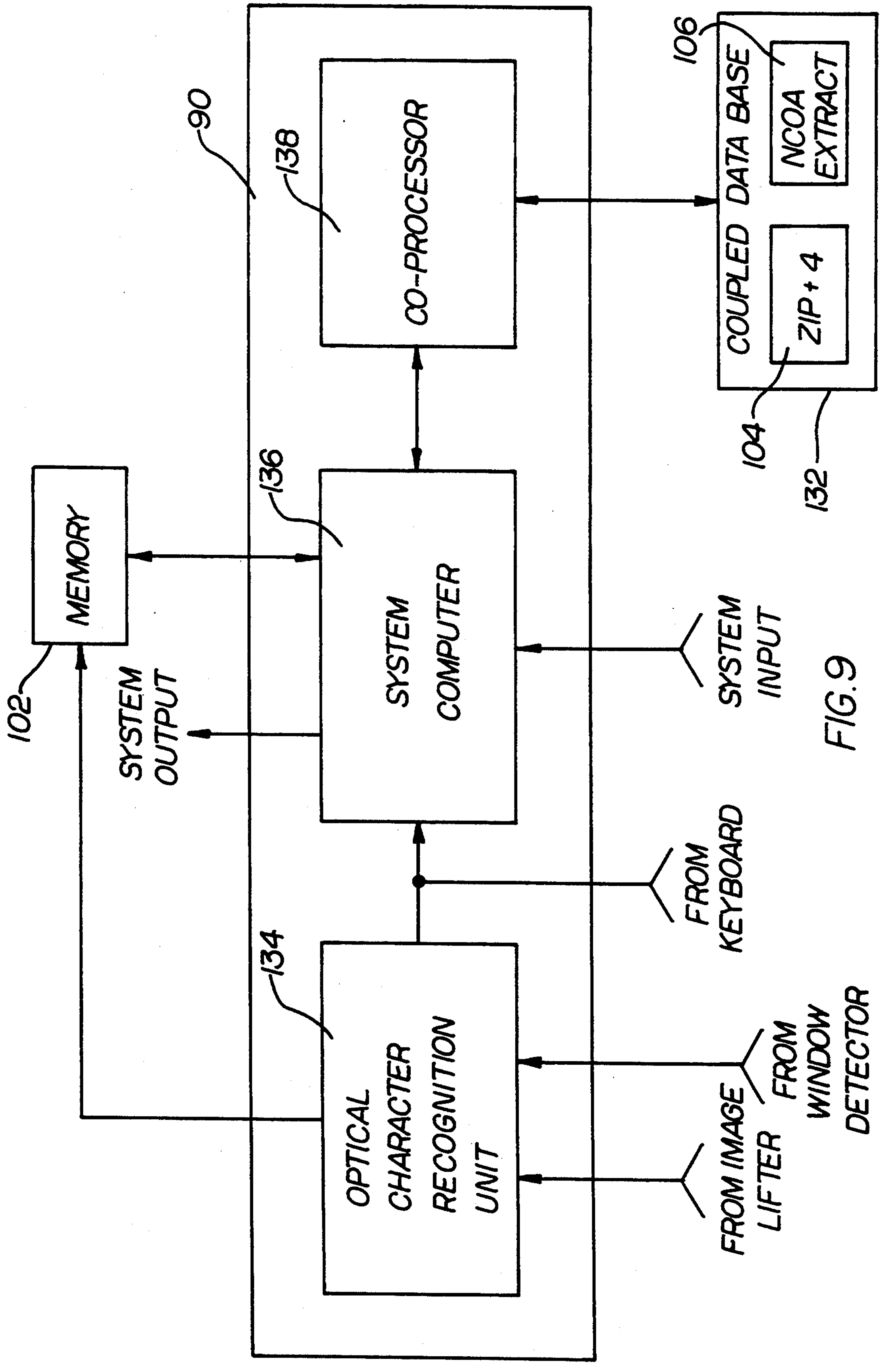
FIG. 9 is a schematic view of a first embodiment of the processing circuit with coupled ZIP+4 and NCOA databases.

Referring now to FIG. 9, there is shown a schematic view of a first embodiment of the processing circuit 90 wherein the ZIP+4 and NCOA databases, 104 and 106, respectively, are coupled in a single memory area 132. The processing unit 90 comprises an optical character recognition unit 134, a system computer 136 and a co-processor 138. It will, of course, be understood that a co-processor 138 need not be included if the system computer operates at a sufficiently fast rate to perform all required tasks. The optical character recognition unit 134 receives the digitized image of each mailpiece from the image lifter 88 (FIGS. 4 and 6) and processes the image to locate each line of the destination address and each character within each line (character information). The optical character recognition unit further processes each character for recognition and outputs the destination address in a data format that is understood by the system computer 136.

For non-machine readable mail in the FMI and/or AMF system embodiments of FIGS. 7 and 8, the character information for the destination address is input by the operator to the system computer 136 from a keyboard 126 as a result of the entry by an operator viewing the digitized image of the mailpiece. In such case, the images are transferred into memory 102 via a LAN or other communication means from a separate memory 102 associated with the lifting of the images from the mail stream. Alternatively, the images are input directly from an image lifter via the system computer 136.

The system computer 136 transmits the character information to the co-processor 138 where the information is decoded to identify the destination address for the mailpiece. The co-processor 138, according to the destination address, accesses the ZIP+4 portion of the coupled database 132 to obtain the corresponding delivery point ZIP code. In the coupled database 132, if a mail forwarding request has been logged against a destination address, the delivery point information (comprised of the delivery point ZIP code and/or destination address) will be flagged notifying the co-processor to decode the character information to identify the name of the destination addressee. The co-processor 138 will then compare the decoded addressee name and destination address with the name and former address of the person who has requested mail forwarding at that delivery point. If the names and addresses match, the co-processor 138 signals the system computer 136 that the mailpiece has been identified as in need of forwarding. The mailpiece will then be intercepted from the mail stream by the sorter 96. If either the delivery point information has not been flagged, the names and addresses do not match or specified USPS forwarding criteria has not been met, then the co-processor 138 will send the system computer 136 the delivery point ZIP code for the decoded destination address for printing on the mailpiece by the printer 94 or the mailpiece will be sent for further processing according to USPS forwarding rules. The coupled database 132 may be expanded to further include the forwarding address for each forwarding request in which case the co-processor 138 will access the coupled database 132 and send back to the system computer 136 the forwarding address and the delivery point ZIP code for the forwarding address.

Figure 10:
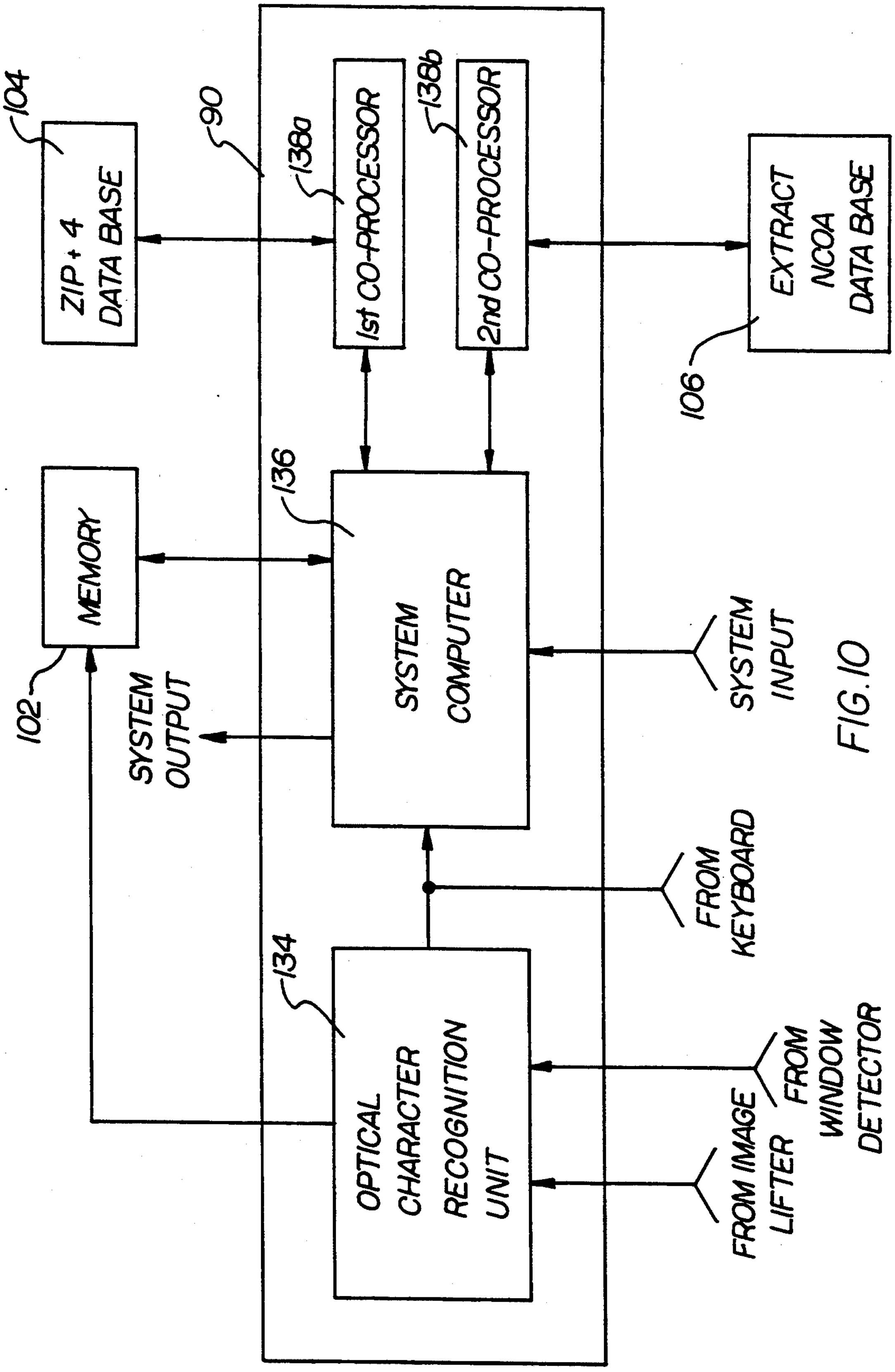
FIG. 10 is a schematic view of a second embodiment of the processing circuit with separately accessed ZIP+4 and NCOA databases.

Referring now to FIG. 10, there is shown a schematic view of a second embodiment of the processing circuit 90 wherein the ZIP+4 and NCOA databases, 104 and 106, respectively, are separately accessed. The processing unit 90 comprises an optical character recognition unit 134, a system computer 136 and separate co-processors 138a and 138b linked to the ZIP+4 and NCOA databases, 104 and 106, respectively. It will, of course, be understood that the use of a separate co-processor 138 will not be necessary in the event the system computer 136 operates at a sufficiently fast rate to perform all required tasks. The optical character recognition unit 134 receives the digitized image of each mailpiece from the image lifter 88 (FIGS. 4 and 6) and processes the image to locate each line of the destination address and each character within each line (character information). The optical character recognition unit further processes each character for recognition and outputs the destination address in a data format that is understood by the system computer 136.

For non-machine readable mail in the FMI and/or AMF system embodiments of FIGS. 7 and 8, the destination address is input by the operator to the system computer 136 from a keyboard 126 as a result of the entry by an operator viewing the digitized image of the mailpiece. In such case, the images are transferred into memory 102 via a LAN or other communication means from a separate memory 102 associated with the lifting of the images from the mail stream. Alternatively, the images are input directly from an image lifter via the system computer 136.

The system computer 136 transmits the character information to the first co-processor 138a where the character information is decoded to identify the destination address for the mailpiece. The first co-processor 138a, according to the decoded destination address, accesses the ZIP+4 database 104 to obtain and return to the system computer 136 the corresponding delivery point ZIP code. The system computer 136 transmits the delivery point information to the second co-processor 138b. The second co-processor 138b, according to the delivery point information, accesses the NCOA database 106 to determine whether a mail forwarding request has been logged against that delivery point. If yes, the second co-processor 138b will use the character information to identify the name of the destination addressee for comparison with the name and address of the person who has requested mail forwarding at that delivery point. If the names and addresses match, the second co-processor 138b signals the system computer 136 that the mailpiece has been identified as in need of forwarding. The mailpiece will then be intercepted from the mail stream by the sorter 96. If no mail forwarding request has been logged against the delivery point, the names and addresses do not match or the USPS forwarding criteria has not been met, the second co-processor 138b will signal the system computer to print the destination (POSTNET) code corresponding to the delivery point ZIP code on the mailpiece or send the mailpiece for further processing according to USPS forwarding rules. The NCOA database 106 may be expanded to further include the forwarding address for each addressee requesting mail forwarding in which case the second co-processor 138b will access the NCOA database 106 and send back the forwarding address and the delivery point ZIP code corresponding to the forwarding address.

With either of the processing circuit 90 and database arrangements illustrated in FIGS. 9 and 10, the system computer 136 further functions to control the operation of each system (FIGS. 4–8) and the processing of each mailpiece. For example, the system computer 136, via the system input, will receive information from the bar code reader 108 to obtain the identification number for each mailpiece and control the operation of the transport 80 and sorter 96, via the system output, to move the mailpieces through the system and into the proper mail pocket. Furthermore, in response to the signals of the co-processor(s) 138, the system computer 136, via the system output, will cause the bar code printer 94 and ID code printer 120 to print identification code or POSTNET codes as required on the mailpieces and direct the printing of the forwarding address by the labeler 112. The system computer 136 also controls the storage of linked digitized mailpiece images, mailpiece data, mailpiece identification numbers and mailpiece forwarding information in the memory 102.

As is well known, often times an addressor of a mailpiece does not wish for an incorrectly addressed mailpiece to be forwarded to the correct destination. Thus, an endorsement such as "DO NOT FORWARD" is placed on the mailpiece. Other times, the addressor wants the mailpiece be forwarded to the addressee. Thus, an endorsement such as "ADDRESS CORRECTION REQUESTED" is placed on the mailpiece. Furthermore, under USPS mail processing rules, certain types and classes of mailpieces are not to be forwarded unless meeting certain known USPS criteria. If mailpieces are to be efficiently handled for forwarding, the automated equipment must be able to distinguish between those mailpieces that are to be forwarded and those that are not to be forwarded.

Figure 11:
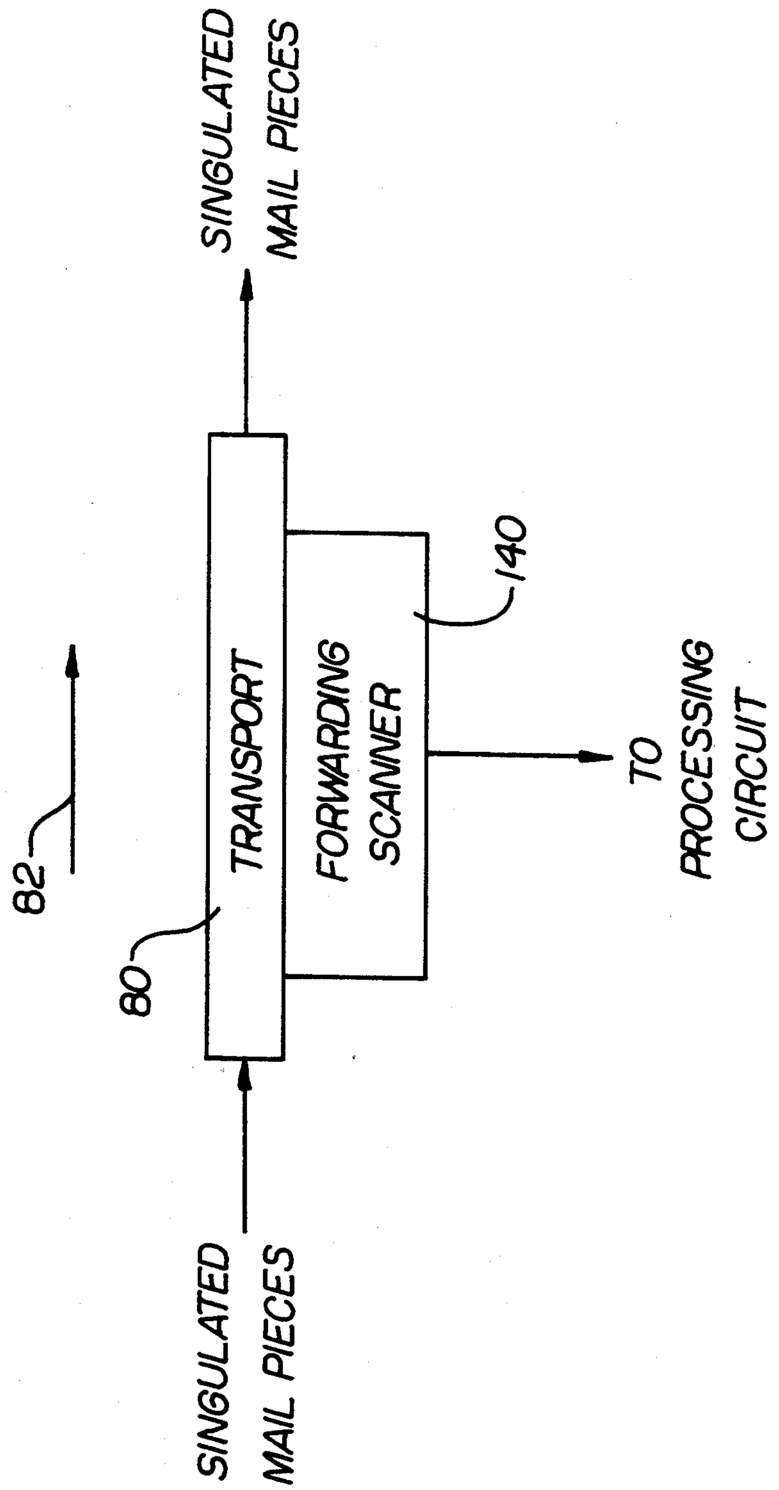
FIG. 11 is a schematic view of a scanner for mechanically identifying forwarding endorsements and requirements placed on mailpieces.

For non-machine readable mailpieces processed by the FMI and AMF systems of FIGS. 7 and 8, machine recognition of forwarding requests and requirements is not necessary because each mailpiece is viewed by human operator who may identify the mailpiece type and forwarding endorsements displayed on the VDT 124 and process, via the keyboard 126, each mailpiece as required or requested. In the FMI and/or AMF systems of FIGS. 4 and 6 for machine readable mailpieces, however, there must exist a means for categorizing the mailpieces according to the forwarding requirements and requests and a means for scanning the mailpieces during processing to identify mailpiece forwarding requirements and requests. Reference is now made to FIG. 3, wherein there is shown a typical mailpiece 44, and FIG. 11, wherein there is shown a scanner 140 mounted to the transport 80 for incorporation into any of the FMI and AMF systems illustrated in FIGS. 4–8 to scan each mailpiece in the mail stream for machine readable forwarding request and requirement markings. It will, of course, be understood that the operations performed by the scanner 140 may be performed by the image lifter 88 or bar code scanner 108.

The existing type of facing identification marks (FIM) 142 on the mailpiece may be used to code the forwarding requests of the addressor or requirements of the USPS. Another option is to place a bar code (of any known type) 144 on the mailpiece, perhaps near the return address, that designates the forwarding request or requirements for the mailpiece. Another option is to optically read mail class identification, forwarding endorsements and return address information. In any case, the scanner 140 will detect and decode the forwarding requests or requirements from the information printed on the mailpiece and transmit the forwarding information to the processing circuit 90 to control the handling of the mailpiece for sorting into a designated mail pocket. If the mailpiece is coded "DO NOT FORWARD" for example, the circuit 90 will direct the mailpiece to be sorted into a special designated pocket.

For an addressor who requests to be informed of a new (forwarding) address for an addressee (according to the information detected by the scanner 140), the image lifter 88 used by the system described in FIGS. 4–8 will capture and digitize an image of the mailpiece for storage in memory for each identified instance of mailpiece forwarding. If an addressor has requested to be informed of the forwarding of incorrectly addressed mailpieces, the digitized images of each forwarded mailpiece will be accessed from memory 102 and off-line printed. The forwarded mailpiece printouts for each addressor are then collected and sent by the USPS to the addressor to provide notification of both the forwarding of the mailpiece and the new forwarding address for the addressee.

The FMI and/or AMF systems of FIGS. 4–8 also provide a means for automatically updating the USPS NCOA database. The information on the USPS Change of Address Order Form (Form 3575), for example, may be scanned by the image lifter 88 and either decoded by specialized forms reading circuits within the processing circuit 90 or viewed and input by an operator through the VDT 124 and keyboard 126. The data from the change of address form may then be processed by the circuit 90 to access and update the NCOA database 106 if the data has not already been entered into the database.

The FMI and/or AMF systems of the present invention may further be integrated with existing USPS automated mail processing equipment with minimal effort. For example, the image lifter 88 and ID code printer 120 of FIGS. 7 and 8 are already present in the current USPS Multiline Optical Character Reader 66 (FIG. 2). USPS Multiline Optical Character Readers 66 decode digitized video images of mailpieces and search the ZIP+4 database to obtain the delivery point ZIP code and print the corresponding destination (POSTNET) bar code in a manner identical to that of the FMI and/or AMF systems of the present invention. Furthermore, the VDT 124 and keyboard 126 for processing digitized images of mailpieces are presently in the USPS Remote Bar Code System 70. Additional component integration opportunities are currently available or may be designed into future system upgrades for the USPS automated equipment.

Although several preferred embodiments of the FMI and/or AMF systems of the present invention have been described in the foregoing Detailed Description and illustrated in the accompanying Drawings, it will be understood that the invention is not limited to the embodiments disclosed, but is capable of numerous rearrangements, substitutions and modifications without departing from the spirit of the invention.

We claim:

1. A mailpiece processing system, comprising:

means for reading a destination address and an addressee name from a mailpiece in a stream of correctly and incorrectly addressed mailpieces;

means for comparing the read destination address and addressee name to a list of incorrect destination addresses and addressee names;

means responsive to the comparison for identifying the mailpiece as an incorrectly addressed mailpiece when the destination address and addressee name on the mailpiece match an incorrect destination address and addressee name on the list; and means for sorting the item from the stream of mailpieces to divert the identified incorrectly addressed mailpiece to a designated area.

2. The mailpiece processing system as in claim 1 wherein the means for reading comprises:

means for scanning the mailpiece to capture a video image of the destination address and addressee name; and means for processing the video image to output the destination address and addressee name.

3. The mailpiece processing system as in claim 2 wherein the destination address and addressee name are comprised of a plurality of lines of alphanumeric characters and the means for processing comprises:

means for locating each line of alphanumeric characters in the output destination address and addressee name; and means for examining each located line to recognize each alphanumeric character therein and output the destination address and addressee name.

4. The mailpiece processing system as in claim 2 wherein the means for processing comprises:

means for visually displaying for a human operator the video image of the destination address and addressee name; and means for receiving data information entered by a human operator according to the display of the video image to output the destination address and addressee name.

5. The mailpiece processing system as in claim 1, further comprising means for correcting the destination address on the incorrectly addressed mailpiece in accordance with an identified forwarding address.

6. The mailpiece processing system as in claim 5 wherein the means for correcting comprises:

means for processing the destination address and addressee name to identify a forwarding address for the named addressee;

means for storing the identified forwarding address in a memory at an addressed identified with a unique mailpiece identification code affixed to the incorrectly addressed mailpiece.

7. The mailpiece processing system as in claim 6 further comprising:

means for scanning the incorrectly addressed mailpiece to read the mailpiece identification code;

means for retrieving the forwarding address for the incorrectly addressed mailpiece from memory according to the read mailpiece identification code; and means for applying the forwarding address to the incorrectly addressed mailpiece to correct the incorrect destination address.

8. The mailpiece processing system as in claim 5 wherein the means for correcting comprises:

means for processing the destination address and addressee name to identify a forwarding address for the named addressee; and means for applying the forwarding address to the incorrectly addressed mailpiece to correct the incorrect destination address.

9. The mailpiece processing system as in claim 5 further including:

means responsive to the correction of the destination address with a forwarding address for generating a forwarding destination code corresponding to the forwarding address; and means for applying the forwarding destination code to the mailpiece.

10. The mailpiece processing system as in claim 5 further including:

means for identifying an addressor of the incorrectly addressed mailpiece; and means for supplying the addressor with the destination address, addressee name and identified forwarding address for the incorrectly addressed mailpiece.

11. The mailpiece processing system as in claim 1 further including:

means for reading a coded forwarding marking on an incorrectly addressed mailpiece;

processing means for decoding the forwarding marking; and means for sorting the incorrectly addressed mailpiece according to the decoded forwarding marking.

12. An item processing system, comprising:

means for reading a delivery destination marking from an item from a stream of items;

means for comparing the read delivery destination marking to a list of incorrect delivery destinations;

means responsive to the comparison for identifying the item as an incorrectly marked item when the delivery destination marking on the item matches an incorrect delivery destination on the list;

means for generating a item forwarding identification number for the identified incorrectly marked item;

means for applying the item forwarding identification number to the identified incorrectly marked item;

means for storing data information related to the delivery destination marking for the identified incorrectly marked item in a memory at an address identified with the item forwarding identification number; and means for sorting the item from the stream of items in accordance with the item forwarding identification number to divert the identified incorrectly marked item to a designated area.

13. The item processing system as in claim 12 further including:

means for receiving an incorrectly marked item from the designated area;

means for scanning the incorrectly marked item to read the item forwarding identification number;

means for retrieving the data information related to the delivery destination marking for the incorrectly marked item from memory according to the read item forwarding identification number;

means for processing the retrieved data information to identify a forwarding delivery destination marking for the incorrectly marked item; and means for applying the forwarding delivery destination marking to the incorrectly marked item to correct the delivery destination marking.

14. The item processing system as in claim 13 further including:

means responsive to the identification of a forwarding delivery marking for the incorrectly marked item for generating a corresponding forwarding destination code; and means for applying the forwarding destination code to the item.

15. An item processing system, comprising:

means for scanning an item to capture a video image of a delivery destination marking;

means for processing the video image to output the delivery destination marking;

means for comparing the output delivery destination marking to a list of incorrect delivery destinations, the list further including a forwarding delivery destination corresponding to each incorrect delivery destination;

means responsive to the comparison for identifying the item as an incorrectly marked item when the delivery destination marking on the item matches an incorrect delivery destination on the list;

means for retrieving a forwarding delivery destination from the list for the incorrectly marked item; and means for applying the forwarding delivery destination to the incorrectly marked item to correct the delivery destination marking.

16. An item processing system, comprising:

means for reading a delivery destination marking from an item;

means for generating a unique item identification number for the item;

means for applying the item identification number to the item;

means for comparing the read delivery destination marking to a list of incorrect delivery destinations;

means responsive to the comparison for storing in a memory, at an address identified with the item identification number, data information related to the delivery destination marking for the item and a notation that the item is incorrectly marked when the delivery destination marking on the item matches an incorrect delivery destination on the list;

means for scanning the item to read the item identification number;

means for retrieving according to the read item identification number any notation stored in memory for the item;

means for processing a retrieved notation for identifying the item as an incorrectly marked item.

17. The item processing system as in claim 16 further including:

means for scanning the incorrectly marked item to read the item identification number;

means for retrieving the data information related to the delivery destination marking for the incorrectly marked item from memory according to the read item identification number;

means for processing the retrieved data information to identify a forwarding destination for the incorrectly marked item; and means for applying the forwarding destination to the incorrectly marked item to correct the delivery destination marking.

18. The item processing system as in claim 17 further including:

means responsive to the identification of a forwarding delivery destination for the incorrectly marked item for generating a corresponding forwarding delivery destination code; and means for applying the forwarding delivery destination code to the item.

19. An item processing system, comprising:

means for reading a delivery destination marking from an item;

means for generating a unique item identification number for the item;

means for applying the item identification number to the item;

means for comparing the read delivery destination marking to a list of incorrect delivery destinations, the list further including a forwarding delivery destination corresponding to each incorrect delivery destination;

means responsive to the comparison for storing in a memory at an address identified with the item identification number a notation that the item is incorrectly marked and the corresponding forwarding delivery destination when the delivery destination marking on the item matches an incorrect delivery destination on the list;

means for scanning the item to read the item identification number;

means for retrieving according to the read item identification number a notation stored in memory identifying the item as an incorrectly marked item along with a forwarding delivery destination for the incorrectly marked item; and means for applying the forwarding delivery destination to the incorrectly marked item to correct the delivery destination marking.

20. A method for processing a mailpiece, comprising the steps of:

scanning the mailpiece to capture a video image of the destination address and addressee name;

processing the video image to output the destination address and addressee name;

comparing the scanned destination address and addressee name to a list of incorrect destination addresses and addressee names;

identifying the mailpiece as an incorrectly addressed mailpiece when the destination address and addressee name on the mailpiece match an incorrect destination address and addressee name on the list; and applying an identified forwarding address to correct the destination address on the incorrectly addressed mailpiece.

21. The method as in claim 20 wherein the destination address and addressee name are comprised of a plurality of lines of alphanumeric characters and the step of processing comprises the steps of:

locating each line of alphanumeric characters in the output destination address and addressee name; and examining each located line to recognize each alphanumeric character therein and output the destination address and addressee name.

22. The method as in claim 20 wherein the step of processing comprises the steps of:

displaying the video image of the destination address and addressee name for a human operator; and receiving data information entered by the human operator according to the display of the video image to output the destination address and addressee name.

23. The method as in claim 20 further including the steps of:

generating a unique mailpiece identification number for the incorrectly addressed mailpiece;

applying the mailpiece identification number to the identified incorrectly addressed mailpiece; and storing data information related to the incorrectly addressed mailpiece in a memory at an address identified with the mailpiece identification number.

24. The method as in claim 20 wherein the step of applying comprises the steps of:

processing the destination address and addressee name to identify a forwarding address for the named addressee;

storing the identified forwarding address in a memory at an address identified with a unique mailpiece identification number affixed to the incorrectly addressed mailpiece.

25. The method as in claim 24 further comprising:

scanning the incorrectly addressed mailpiece to read the mailpiece identification number;

retrieving the forwarding address for the incorrectly addressed mailpiece from memory according to the read mailpiece identification number; and applying the forwarding address to the incorrectly addressed mailpiece to correct the destination address.

26. The method as in claim 20 wherein the step of applying comprises the steps of:

processing the destination address and addressee name to identify a forwarding address for the named addressee; and applying the forwarding address to the incorrectly addressed mailpiece to correct the destination address.

27. The method as in claim 20 further including the steps of:

generating a forwarding destination number corresponding to the forwarding address; and applying the forwarding destination number to the mailpiece.

28. The method as in claim 20 further including the steps of:

identifying an addressor of the incorrectly addressed mailpiece; and supplying the addressor with the destination address, addressee name and forwarding address for the incorrectly addressed mailpiece.

29. The method as in claim 20 further including the steps of:

reading a numbered forwarding marking on an incorrectly addressed mailpiece;

decoding the forwarding marking; and sorting the incorrectly addressed mailpiece according to the denumbered forwarding marking.

30. A method for processing an item, comprising the steps of:

reading a delivery destination marking from an item;

comparing the read delivery destination marking to a list of incorrect delivery destinations;

identifying the item as an incorrectly marked item when the delivery destination marking on the item matches an incorrect delivery destination on the list;

generating a unique item forwarding identification number for the identified incorrectly marked item;

applying the item forwarding identification number to the identified incorrectly marked item;

storing data information related to the delivery destination marking for the identified incorrectly marked item in a memory at an address identified with the item forwarding identification number; and sorting the item in accordance with the item forwarding identification number to divert the identified incorrectly marked item to a designated area.

31. The method for processing as in claim 30 further including the steps of:

receiving an incorrectly marked item from the designated area;

scanning the incorrectly marked item to read the item forwarding number;

retrieving the data information related to the delivery destination marking for the incorrectly marked item forwarding from memory according to the read item identification number;

processing the retrieved data information to identify a forwarding delivery destination for the incorrectly marked item; and applying the forwarding delivery destination to the incorrectly marked item to correct the delivery destination marking.

32. The method for processing as in claim 31 further including the steps of:

generating a forwarding destination number corresponding to the forwarding delivery destination for the incorrectly marked item; and applying the forwarding destination number to the item.

33. A method for processing an item, comprising the steps of:

scanning an item to capture a video image of a delivery destination marking;

processing the video image to output the delivery destination marking;

comparing the output delivery destination marking to a list of incorrect delivery destinations, the list further including a forwarding delivery destination corresponding to each incorrect delivery destination;

identifying the item as an incorrectly marked item when the delivery destination marking on the item matches an incorrect delivery destination marking on the list;

retrieving a forwarding delivery destination from the list for the incorrectly marked item; and applying the forwarding delivery destination to the incorrectly marked item to correct the delivery destination marking.

34. A method for processing an item, comprising the steps of:

reading a delivery destination marking from an item;

generating a unique item identification number for the item;

applying the item identification number to the item;

comparing the read delivery destination marking to a list of incorrect delivery destinations;

storing in a memory, at an address identified with the item identification number, data information related to the delivery destination marking for the item and a notation that the item is incorrectly marked when the delivery destination marking on the item matches an incorrect delivery destination on the list;

scanning the item to read the item identification number;

retrieving according to the read item identification number any notation stored in memory for the item;

processing a retrieved notation to identify the item as an incorrectly marked item.

35. The method for processing as in claim 34 further including the steps of:

scanning the incorrectly marked item to read the item identification number;

retrieving the data information related to the delivery destination marking for the incorrectly marked item from memory according to the read item identification number;

processing the retrieved data information to identify a forwarding destination for the incorrectly marked item; and applying the forwarding destination to the incorrectly marked item to correct the delivery destination marking.

36. The method for processing as in claim 35 further including the steps of:

generating a forwarding delivery destination code corresponding to a forwarding delivery destination for the incorrectly marked item; and applying the forwarding delivery destination code to the item.

37. A method for processing an item, comprising:

reading a delivery destination marking from an item;

generating a unique item identification number for the item;

applying the item identification number to the item;

comparing the read delivery destination marking to a list of incorrect delivery destinations, the list further including a forwarding delivery destination corresponding to each incorrect delivery destination;

storing in a memory, at an address identified with the item identification number, a notation that the item is incorrectly marked and the corresponding forwarding delivery destination marking when the delivery destination marking on the item matches an incorrect delivery destination marking on the list;

scanning the item to read the item identification number;

retrieving according to the read item identification number a notation stored in memory identifying the item as an incorrectly marked item along with a forwarding delivery destination marking for the incorrectly marked item; and applying the forwarding delivery destination marking to the incorrectly marked item to correct the delivery destination marking.

38. An item processing system, comprising:

an optical scanner for reading delivery destination markings from each item in a substantially continuous stream of items;

means for comparing the read delivery destination markings to a list of incorrect delivery destinations;

means responsive to the comparison for identifying an item as an incorrectly marked item when the delivery destination marking on the item matches an incorrect delivery destination on the list; and means for sorting the item from the stream of items so that the incorrectly marked item will be diverted to a designated area.

39. The item processing system of claim 38, further including means within the designation area for correcting the destination marking on the incorrectly marked item in accordance with an identified forwarding marking.

40. A mailpiece processing system, comprising:

means for reading a destination address and an addressee name from a mailpiece;

means for comparing the read destination address and addressee name to a list of incorrect destination addresses and addressee names;

means responsive to the comparison for identifying an incorrectly addressed mailpiece when the destination address and addressee name on the mailpiece match an incorrect destination address and addressee name on the list;

means for generating a unique mailpiece identification code for the incorrectly addressed mailpiece;

means for applying the mailpiece identification code to the identified incorrectly addressed mailpiece; and means for storing data related to the incorrectly addressed mailpiece in a memory at an address identified with the mailpiece identification code.

41. A method for processing a mailpiece, comprising the steps of:

reading a destination address and an addressee name from a mailpiece;

comparing the read destination address and addressee name to a list of incorrect destination addresses and addressee names;

identifying the mailpiece as an incorrectly addressed mailpiece when the destination address and addressee name on the mailpiece match an incorrect destination address and addressee name on the list;

generating a unique mailpiece identification number for the incorrectly addressed mailpiece;

applying the mailpiece identification number to the identified incorrectly addressed mailpiece; and storing data information relating to the incorrectly addressed mailpiece in a memory at an addressed identified with the mailpiece identification number.

* * * * *

UNITED STATES PATENT AND TRADEMARK OFFICE

CERTIFICATE OF CORRECTION

PATENT NO. : 5,422,821

DATED : June 6, 1995

INVENTOR(S) : Ronald L. Allen, Brenda J. Bishop-Jones, Michael J. Cykana, Eddie K. Lui, Stanley W. Sipe It is certified that error appears in the above-indentified patent and that said Letters Patent is hereby corrected as shown below:

Column 17, line 63, "delivery marking" should be -- delivery destination marking --.

Column 21, line 9, "forwarding number" should be -- forwarding identification number --.

Signed and Sealed this

Thirtieth Day of July, 1996

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,422,821

DATED : June 6, 1995

INVENTOR(S) : Ronald L. Allen, Brenda J. Bisho-Jones, Michael J. Cykana, Eddie K. Lui, Stanley W. Sipe It is certified that error appears in the above-indentified patent and that said Letters Patent is hereby corrected as shown below:

Column 21, line 12, "item forwarding from memory" should be --item from memory--.

Column 21, line 13, "item identification number" should be --item forwarding identification number--.

Signed and Sealed this

Nineteenth Day of November, 1996

Attest:

BRUCE LEHMAN

*Attesting Officer* *Commissioner of Patents and Trademarks*

US005422821B1

REEXAMINATION CERTIFICATE (3578th)

United States Patent [19]

[11] B1 5,422,821

Allen et al.

[45] Certificate Issued Jul. 21, 1998

[54] APPARATUS FOR INTERCEPTING AND FORWARDING INCORRECTLY ADDRESSED POSTAL MAIL

[75] Inventors: Ronald L. Allen, Grand Prairie; Brenda J. Bishop-Jones; Michael J. Cykana, both of Arlington; Eddie K. Lui, Euless; Stanley W. Sipe, Arlington, all of Tex.

[73] Assignee: Electrocom Automation, L.P., Arlington, Tex.

Reexamination Request:
No. 90/004,579, Mar. 13, 1997

Reexamination Certificate for:
Patent No.: 5,422,821
Issued: Jun. 6, 1995
Appl. No.: 864,437
Filed: Apr. 6, 1992

Certificate of Correction issued Nov. 19, 1996.

Certificate of Correction issued Jul. 30, 1996.

[51] Int. Cl.$^{6}$ .......... G06F 17/60
[52] U.S. Cl. .......... 364/478.07; 209/584; 209/900
[58] Field of Search .......... 364/478.01–478.03, 364/478.07, 478.08, 478.09, 478.1, 478.11, 478.12, 478.13, 478.14, 478.15, 464.03, 464.02; 235/375; 209/900, 554; 270/58; 198/349.6; 177/4; 382/101, 102

[56] References Cited

U.S. PATENT DOCUMENTS 4,871,903 10/1989 Carrell .
4,979,605 12/1990 Suyatsky .......... 198/349

*Primary Examiner*—Jim Trimmell

[57] ABSTRACT

The present invention comprises apparatus for identifying, intercepting and forwarding incorrectly addressed mailpieces having either a machine readable or non-machine readable address. The apparatus reads (either mechanically or manually) the addressee name and the mailpiece destination marking address for processing in a database and comparison to a list of names and former addresses in the USPS National Change of Address database of persons who have requested mail forwarding service. If the read name and address match a name and former address in the database, then the mailpiece is identified as having an incorrect address and intercepted from the mail stream. The apparatus then searches the NCOA database for a forwarding address and delivery point ZIP code corresponding to the address. The forwarding address and delivery point ZIP marking number are printed on the mailpiece in place of the incorrect address and the mailpiece is returned to the mail stream for delivery to the addressee.

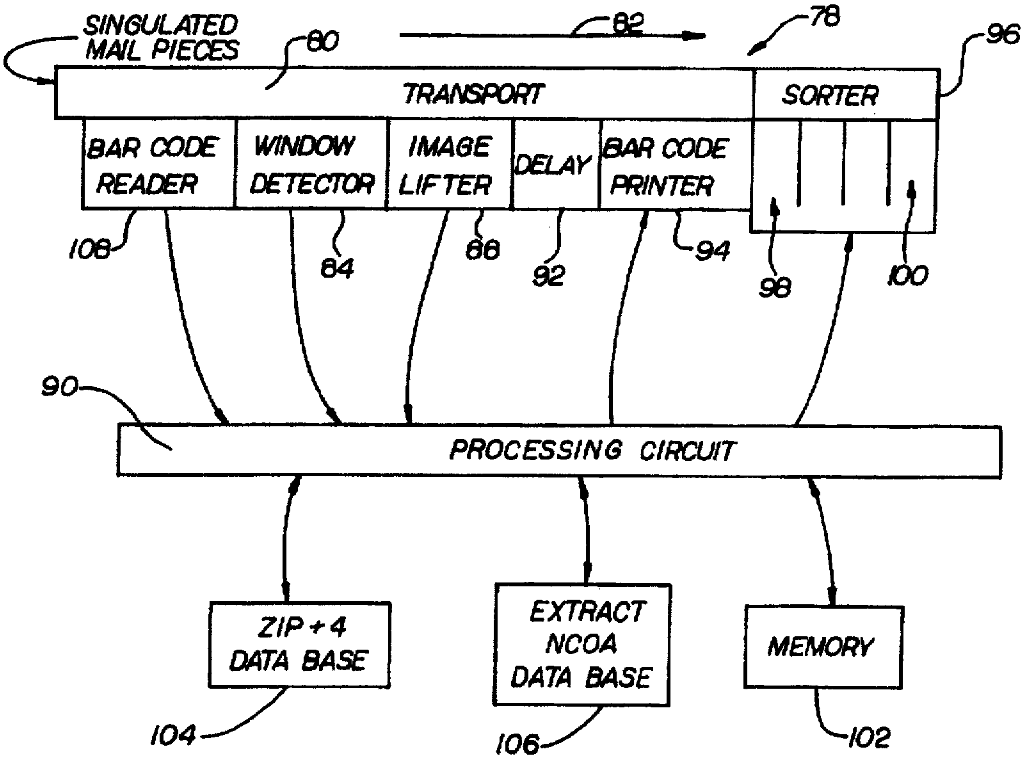

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–21, 24, 29, 30, 33, 34, 37–40 and 41 are determined to be patentable as amended.

Claims 22, 23, 25–28, 31, 32, 35 and 36, dependent on an amended claim, are determined to be patentable.

New claims 42–48 and 49 are added and determined to be patentable.

1. A mailpiece processing system *for forwarding identification*, comprising:
   - [means] *a data scanner* for reading a destination address and an addressee name from a mailpiece in a stream of correctly and incorrectly addressed mailpieces;
   - [means] *a processor* for comparing the read destination address and addressee name to a list of incorrect destination addresses and addressee names;
   - [means] *said processor* responsive to the comparison for identifying the mailpiece as an incorrectly addressed mailpiece *only* when *both* the destination address and addressee name on the mailpiece match an incorrect destination address and addressee name on the list; and
   - [means] *a mailpiece sorter* for sorting the [item] *mailpiece* from the stream of mailpieces to divert the identified incorrectly addressed mailpiece to a designated area.

2. The mailpiece processing system as in claim 1 wherein the [means for reading] *data scanner* comprises:
   - [means] *a character reader* for scanning the mailpiece to capture a video image of the destination address and addressee name; and
   - [means] *an optical character recognition unit* for processing the video image to output the destination address and addressee name.

3. The mailpiece processing system as in claim 2 wherein the destination address and addressee name [are comprised of] *comprise* a plurality of lines of alphanumeric characters and the [means for processing] *processor* comprises:
   - means for locating each line of alphanumeric characters in the output destination address and addressee name; and
   - means for examining each located line to recognize each alphanumeric character therein and output the destination address and addressee name.

4. The mailpiece processing system as in claim [2] *1* wherein [the means for processing] *said data scanner* comprises:
   - [means] *a display* for visually displaying [for] *to* a human operator the video image of the destination address and addressee name; and
   - [means] *an input terminal* for receiving data information entered by a human operator according to the display at the video image to output the destination address and addressee name.

5. The mailpiece processing system as in claim 1, further comprising [means] *a printer* for correcting the destination address on the incorrectly addressed mailpiece in accordance with an identified forwarding address.

6. The mailpiece processing sytem as in claim 5 [wherein the means for correcting comprises] *further comprising*:
   - [means for processing] *said processor responds to* the destination address and addressee name to identify a forwarding address for the named address;
   - [means] *a memory* for storing the identified forwarding address [in a memory] at [an] *a memory* [addressed] *address* identified with a unique mailpiece identification code affixed to the incorrectly addressed mailpiece.

7. The mailpiece processing system as in claim 6 further comprising:
   - [means] *a data scanner* for scanning the incorrectly addressed mailpiece to read the mailpiece identification code;
   - [means for] *said processor* retrieving the forwarding address for the incorrectly addressed mailpiece from memory according to the read mailpiece identification code; and
   - [means for] *said printer* applying the forwarding address to the incorrectly addressed mailpiece to correct the incorrect destination address.

8. The mailpiece processing system as in claim [5 wherein the means for correcting comprises] *1 further comprising*:
   - [means for processing] *said processor responds to* the *read* destination address and addressee name to identify a forwarding address for the named addressee; and
   - [means] *a labeler* for applying the forwarding address to the incorrectly addressed mailpiece to correct the incorrect destination address.

9. The mailpiece processing system as in claim [5] *1* further including:
   - [means responsive] *said processor responds* to [the] correction of the destination address with a forwarding address [for generating] *to generate* a forwarding destination code corresponding to the forwarding address; and
   - [means] *a printer* for applying the forwarding destination code to the mailpiece.

10. The mailpiece processing system as in claim [5] *1* further including:
    - [means for] *said processor* identifying an addressor of the incorrectly addressed mailpiece; and
    - means for supplying the addressor with the destination address, addressee name and identified forwarding address for the incorrectly addressed mailpiece.

11. The mailpiece processing system as in claim 1 further including:
    - [means] *a data scanner* for reading a coded forwarding marking on an incorrectly addressed mailpiece;
    - [processing means for] *said processor* decoding the fowarding marking; and
    - [means] *a sorter* for sorting the incorrectly addressed mailpiece according to the decoded forwarding marking.

12. An item processing system comprising:
    - [means] *a data scanner* for reading a delivery destination marking from an item from a stream of items;
    - [means] *a processor* for comparing the read delivery destination marking to a list of incorrect delivery destinations;

[means] *said processor* responsive to the comparison for identifying the item as an incorrectly marked item when the delivery destination marking on the item matches an incorrect delivery destination on the list;

[means for] *said processor* generating a item forwarding identification number for the identified incorrectly marked item;

[means] *a printer* for applying the item forwarding identification number to the identified incorrectly marked item;

[means] *a memory* for storing data information related to [the] *a forwarding* delivery destination marking for the identified incorrectly marked item [in a memory] at an address identified with the item forwarding identification number; and

[means] *a sorter* for sorting the item from the stream of items in accordance with the item forwarding identification number to divert the identified incorrectly marked item to a designated area.

13. The item processing system as in claim 12 further including:

[means] *an item transport* for receiving an incorrectly marked item from the designated area;

[means] *a data scanner* for scanning the incorrectly marked item to read the item forwarding identification number;

[means] *a processor* for retrieving the data information related to the delivery destination marking for the incorrectly marked item [for] *from* memory according to the read item forwarding identification number;

[means for] *said processor* processing the retrieved data information to identify [a] *the* forwarding delivery destination marking for the incorrectly marked item; and

[means] *a printer* for applying the forwarding delivery destination marking to the incorrectly marked item to correct the delivery destination marking.

14. The item processing system as in the claim 13 further including:

[means] *said processor* responsive to the identification of a forwarding delivery marking for the incorrectly marked item for generating a corresponding forwarding destination code; and

[means for] *said printer* applying the forwarding destination code to the item.

15. An item processing system comprising:

[means] *a data scanner* for scanning an item to capture a video image of a delivery destination marking;

means for processing the video image to output the delivery destination marking;

*a processor responsive to the delivery destination marking for accessing a database containing delivery destinations, said processor identifying a delivery destination logged as an incorrect delivery destination;*

*a sorter for diverting an item not logged as an incorrect destination to a designated area for further processing;*

[means] *said processor* [for] comparing the output delivery destination marking *of an item having a logged incorrect delivery destination* to a list of incorrect delivery destinations the list further including a forwarding delivery destination corresponding to each incorrect delivery destination;

[means] *said processor* responsive to the comparison for identifying the item as an incorrectly marked item when the delivery destination marking on the item matches an incorrect delivery destination on the list;

[means for] *said processor* retrieving a forwarding delivery destination from the list [of] *for* the incorrectly marked item; and

[means] *a printer* for applying the forwarding delivery destination to the incorrectly marked item to correct the delivery destination marking.

16. An item processing system, comprising:

[means] *a data reader* for reading a delivery destination marking from an item;

[means] *a processor* for generating a unique item identification number for the item;

[means] *a printer* for applying the item identification number to the item;

[means for] *said processor* comparing the read delivery destination marking to a list of incorrect delivery destinations;

[means] *a memory* responsive to the comparison for storing [in a memory,] at an address identified with the item identification number, data information related to the delivery destination marking for the item and a notation that the item is incorrectly marked when the delivery destination marking on the item matches an incorrect delivery destination on the list;

[means] *a data reader* for scanning the item to read the item identification number;

[means] *a processor* for retrieving according to the read item identification number any notation stored in memory for the item; *and* means for processing a retrieved notation for identifying the item as an incorrectly marked item.

17. The item processing system as in claim 16 further including:

[means] *a data reader* for scanning the incorrectly marked item to read the item identification number;

[means] *a processor* for retrieving the data information related to the delivery destination marking for the incorrectly marked item from memory according to the read item identification number;

[means for] *said processor* processing the retrieved data information to identify a forwarding *delivery* destination for the incorrectly marked item; and

[means] *a printer* for applying the forwarding *delivery* destination to the incorrectly marked item to correct the delivery destination marking.

18. The item processing system as in claim 17 further including:

[means] *said processor* responsive to the identification of a forwarding delivery destination for the incorrectly marked item for generating a corresponding forwarding delivery destination code; and

[means for] *said printer* applying the forwarding delivery destination code to the item.

19. An item processing system, comprising:

[means] *a data scanner* for reading a delivery destination marking from an item;

[means] *a processor* for generating a unique item identification number for the item;

[means] *a printer* for applying the item identification number to the item;

[means for] *said processor* comparing the read delivery destination marking to a list of incorrect delivery destinations, the list further including a forwarding delivery destination corresponding to each incorrect delivery destination;

[means] *a memory* responsive to the comparison for storing [in a memory] at an address identified with the item identification number a notation that the item is incorrectly marked and the corresponding forwarding delivery destination when the delivery destination marking on the item matches an incorrect delivery destination on the list;

[means for] *said data scanner* scanning the item to read the item identification number;

[means for] *said processor* retrieving according to the read item identification number a notation stored in memory identifying the item as an incorrectly marked item along with a forwarding delivery destination for the incorrectly marked item; and

[means] *a printer* for applying the forwarding delivery destination to the incorrectly marked item to correct the delivery destination marking.

20. A method for processing a mailpiece *for forwarding mail identification and mail forwarding*, comprising the steps of:

scanning the mailpiece to capture a video image of the destination address and addressee name;

processing the video image to output the destination address and addessee name;

comparing the scanned destination address and addressee name to a list of incorrect destination addresses and addressee names;

[identifying the mailpiece as an incorrectly addressed mailpiece when the destination address and addressee name on the mailpiece match an incorrect destination address and addressee name on the list; and]

*identifying the mailpiece as an incorrectly addressed mailpiece only when the destination address matches an incorrect destination address on the list and also when the addressee name on the mailpiece matches an incorrect addressee name on the list; and* applying an identified fowarding address to correct the destination address on the incorrectly addressed mailpiece.

21. The method as in claim 20 wherein the destination address and addressee name [are comprised of ] *comprise* a plurality of lines of alphanumeric characters and the step of processing comprises the steps of:

locating each line of alphanumeric characters in the output destination address and addressee name, and examining each located line to recognize the alphanumeric character therein and output the destination address and addressee name.

24. The method as in claim 20 wherein the step of applying comprises the steps of:

*identifying with a unique mailpiece identification number an incorrectly addressed mailpiece;*

*affixing to the incorrectly addressed mailpiece the unique mailpiece identification number;* processing the destination address and addressee name to identify a forwarding address for the named addressee;

storing the identified forwarding address in a memory at an address identified with [a] *the* unique mailpiece identification number affixed to the incorrectly addressed mailpiece.

29. The method as in claim 20 further including the steps of:

reading a numbered forwarding marking on an incorrectly addressed mailpiece;

decoding the forwarding marking; and sorting the incorrectly addressed mailpiece according to the [denumbered] *decoded numbered* forwarding marking.

30. A method for processing an item *for forwarding identification and sorting* comprising the steps of:

reading a delivery destination marking from an item;

*accessing a database containing delivery destination markings to identify a delivery destination logged as an incorrect delivery destination;*

*sorting an item not logged as an incorrect delivery destination to a designated area for further processing;* comparing the read delivery destination marking *identified as a logged incorrect delivery destination* to a list of incorrect delivery destinations;

identify the item as an incorrectly marked item when the delivery destination marking on the item matches an incorrect delivery destination on the list;

generating a unique item forwarding identification number for the identified incorrectly marked item;

applying the item forwarding identification number to the identified incorrectly marked item;

storing data information related to the delivery destination marking for the identified incorrectly marked item in a memory at an address identified with the item forwarding identification number; and sorting the item in accordance with the item forwarding identification number to divert the identified incorrectly marked item to a designated area.

33. A method for processing an item *for forwarding identification and marking*, comprising the steps of:

scanning an item to capture a video image of a delivery destination marking;

processing the video image to output the delivery destination marking;

*accessing a database containing delivery destination markings to identify a delivery destination logged as an incorrect delivery destination;*

*sorting an item not logged as an incorrect delivery destination to a designated area for further processing;* comparing the output delivery destination marking *identified as a logged incorrect delivery destination* to a list of incorrect delivery destinations, the list further including a forwarding delivery destination corresponding to each incorrect delivery destination;

identifying the item as an incorrectly marked item when the delivery destination marking on the item matches an incorrect delivery destination marking on the list;

retrieving a forwarding delivery destination from the list for the incorrectly marked item; and applying the forwarding delivery destination to the incorrectly marked item to correct the delivery destination marking.

34. A method for processing an item *for forwarding identification and marking*, comprising the steps of:

reading a delivery destination marking from an item;

generating a unique item identification number for the item;

applying the item identification number to the item;

comparing the read delivery destination marking to a list of incorrect delivery destinations;

storing in a memory, at an address identified with the item identification number, data information related to the delivery destination marking for the item and a *forwarding* notation that the item is incorrectly marked when the delivery destination marking on the item matches an incorrect delivery destination on the list;

scanning the item to read the item identification number;

retrieving according to the read item identification number any *forwarding* notation stored in memory for the item;

processing a retrieved *forwarding* notation to identify the item as an incorrectly marked item.

37. A method for processing an item *for forwarding identification and marking*, comprising:

reading a delivery destination marking from an item;

generating a unique item identification number for the item;

applying the item identification number to the item;

comparing the read delivery destination marking to a list of incorrect delivery destinations, the list further including a forwarding delivery destination corresponding to each incorrect delivery destination;

storing in a memory, at an address identified with the item identification number, a notation that the item is incorrectly marked and the corresponding forwarding delivery destination marking when the delivery destination marking on the item matches an incorrect delivery destination marking on the list;

scanning the item to read the item identification number;

retrieving according to the read item identification number a notation stored in memory identifying the item as an incorrectly marked item along with a forwarding delivery destination marking for the incorrectly marked item; and applying the forwarding delivery destination marking to the incorrectly marked item to correct the delivery destination marking.

38. An item processing system *for forwarding identification and marking*, comprising:

an optical scanner for reading delivery destination markings from each item in a substantially continuous stream of items;

*a processor responsive to the delivery destination markings for accessing a database containing delivery destinations, said processor identifying a delivery destination logged as an incorrect delivery destination;*

*a sorter for diverting an item not logged as an incorrect delivery destination to a designated area for further processing.*

[means for] *said processor* comparing the read delivery destination markings *for an item marked as a logged incorrect delivery destination* to a list of incorrect delivery destinations;

[means] *said processor* responsive to the comparison for identifying an item as an incorrectly marked item when the delivery destination marking on the item matches an incorrect delivery destination on the list; and

[means for sorting ] *the sorter diverting* the item from the stream of items [so that the incorrectly marked item will be diverted] to a designated area.

39. The item processing system of claim 38, further including means within the [designation] *designated* area for correcting the destination marking on the incorrectly marked item in accordance with an identified forwarding marking.

40. A mailpiece processing system *for forwarding identification and marking*, comprising:

[means] *a data scanner* for reading a destination address and an addressee name from a mailpiece;

means for comparing the read destination address and addressee name to a list of incorrect destination addresses and addressee names;

[means responsible to the comparison for identifying an incorrectly addressed mailpiece when the destination address and addressee name on the mailpiece match an incorrect destination address and addressee name on the list;]

*a processor for accessing a database containing destination addresses to identify a destination address logged as an incorrect destination address;*

*a sorter for sorting a mailpiece having a destination address not logged as an incorrect destination address to a designated area for further processing;*

[mean for] *said processor* generating a unique mailpiece identification code for [the incorrectly addressed mailpiece] *a mailpiece having a destination address logged as an incorrect destination address*;

[means] *a printer* for applying the mailpiece identification code to the identified incorrectly addressed mailpiece; and

[means] *a memory* for storing data related to the incorrectly addressed mailpiece [in a memory] at an address identified with the mailpiece identification code.

41. A method for processing a mailpiece *for forwarding identification*, comprising the steps of:

reading a destination address and an addressee name from a mailpiece;

comparing the read destination address and addressee name of a list of incorrect destination addresses and addressee names;

identifying the mailpiece as an incorrectly addressed mailpiece *only* when the destination address and addressee name on the mailpiece *both* match an incorrect destination address and addressee name on the list;

generating a unique mailpiece identification number for the incorrectly identified mailpiece;

applying the mailpiece identification number to the identified incorrectly addressed mailpiece; and storing data information relating to the incorrectly addressed mailpiece in a memory at an addressed identified with the mailpiece identification number.

*42. A method for processing a mailpiece for forwarding mail identification and mail forwarding, comprising the steps of:*

*scanning the mailpiece to capture a video image of the destination address and addressee name;*

*processing the video image to output the destination address and addressee name;*

*identifying a destination address having been logged for mailpiece forwarding in a database containing destination codes;*

*applying a destination code to a mailpiece not identified as logged for forwarding;*

*comparing the scanned destination address and addressee name to a list of incorrect destination addresses and addressee names for a destination address logged for forwarding;*

*identifying the mailpiece as an incorrectly addressed mailpiece only when the destination address matches*

*an incorrect destination address on the list and also the addressee name on the mailpiece matches an addressee name on the list; and*

*applying a forwarding address to the mailpiece to correct the destination address on the incorrectly addressed mailpiece.*

*43. A mailpiece processing system for forwarding identification and mail forwarding, comprising:*

*a data scanner for reading destination data from a mailpiece in a stream of correctly and incorrectly addressed mailpiece;*

*a processor responsive to the destination data for accessing a database containing destination codes, said processor identifying destination data having been logged for mailpiece forwarding;*

*a mailpiece sorter for applying a destination code from the database to a mailpiece in response to said processor identifying a mailpiece not logged for forwarding;*

*said processor in response to destination data logged for forwarding comparing the read destination data to a list of forwarding destination data to identify a mailpiece to be forwarded to a changed destination, said processor generating a comparison when the read destination data matches one of the listed forwarding destination data;*

*said processor responsive to the generated comparison to identify a mailpiece to be forwarded to a changed destination; and*

*said mailpiece sorter diverting a mailpiece identified for forwarding to a designated area for further processing.*

*44. A mailpiece processing system as set forth in claim 43, wherein said data scanner comprises a bar code reader to read mailpieces bar coded with destination data.*

*45. A mailpiece processing system as set forth in claim 43, further comprising a labeler for affixing a forwarding label to the mailpiece and printing forwarding destination data thereon.*

*46. A mailpiece processing system as set forth in claim 43, further comprising a printer for applying to the mailpiece a destination bar code corresponding to the delivery point zip code for the forwarding destination data.*

*47. A mailpiece processing system, comprising:*

*a data scanner for reading a destination address and an address name from a mailpiece in a stream of correctly and incorrectly addressed mailpieces;*

*a processor responsive to the destination address for accessing a database containing destination codes, said processor identifying a destination address logged for mail forwarding;*

*a mailpiece printer for applying a destination code to a mailpiece in response to said processor identifying a mailpiece not logged for forwarding;*

*said processor in response to a logged destination address comparing the read destination address to a list of destination addresses to identify a mailpiece to be forwarded to a changed address and generating a comparison when the read destination address matches a listed destination address;*

*said processor comparing the read addressee name to an addresee name identified with the matched listed destination addres in response to a comparison of the destination addresses and generating a comparison for an addressee name match;*

*said processor responsive to the match comparison of the addressee names to identify a mailpiece to be forwarded to the changed address; and*

*a mailpiece sorter diverting a mailpiece identified for forwarding to a designated area for further processing.*

*48. A mailpiece processing system for forwarding identification and mail forwarding, comprising:*

*a data scanner for reading a destination address, an addressee name and forwarding endorsements from a mailpiece in a stream of correctly and incorrectly addressed mailpieces;*

*a processor responsive to the destination address for accessing a database containing destination codes, said processor identifying a destination address logged for mail forwarding;*

*a mailpiece printer for applying a destination code to a mailpiece in response to said processor identifying a mailpiece not logged for forwarding;*

*said processor in response to identification of a destination address logged for mailpiece forwarding comparing the read destination address and the addressee name to a list of incorrect destination addresses and addressee names;*

*said processor generating a comparison only when both the read destination address matches a listed incorrect destination address and the addressee name matches a listed corresponding addressee name;*

*said processor responsive to the generated comparison and to the forwarding endorsements to identify a mailpiece to be forwarded to the changed address; and*

*a mailpiece sorter diverting a mailpiece identified for forwarding to a designated area for further processing.*

*49. A mailpiece processing system as set forth in claim 48 further comprising:*

*said processor responsive to the generated comparison and to the forwarding endorsements to identify a mailpiece to be returned to the addressor; and*

*said mailpiece sorter diverting a mailpiece identified for returning to the addressor to a designated area for further processing.*

* * * * *